US012527942B2

(12) United States Patent
Shang et al.

(10) Patent No.: US 12,527,942 B2
(45) Date of Patent: Jan. 20, 2026

(54) PULMONARY VEIN SHUNTING

(71) Applicant: Edwards Lifesciences Corporation, Irvine, CA (US)

(72) Inventors: Hao Shang, Irvine, CA (US); Zheng Lin, Fountain Valley, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 1027 days.

(21) Appl. No.: 17/588,856

(22) Filed: Jan. 31, 2022

(65) Prior Publication Data
US 2022/0241564 A1    Aug. 4, 2022

Related U.S. Application Data

(60) Provisional application No. 63/144,218, filed on Feb. 1, 2021.

(51) Int. Cl.
*A61M 27/00*    (2006.01)
*A61B 18/00*    (2006.01)
(Continued)

(52) U.S. Cl.
CPC ........... *A61M 27/002* (2013.01); *A61B 18/14* (2013.01); *A61F 2/86* (2013.01); *A61M 29/00* (2013.01);
(Continued)

(58) Field of Classification Search
CPC ............ A61B 2017/1139; A61B 18/14; A61B 2018/00577; A61B 2018/00601;
(Continued)

(56) References Cited

U.S. PATENT DOCUMENTS 3,538,917 A    11/1970    Selker
3,675,656 A    7/1972    Hakim
(Continued)

FOREIGN PATENT DOCUMENTS

WO    2020163659 A1    8/2020
WO    2020215090 A1    10/2020
(Continued)

OTHER PUBLICATIONS

Zierer et al., "Interatrial shunt for chronic pulmonary hypertension: differential impact of low-flow v. high-flow shunting", American Journal of Physiology Heart and Circulatory Physiology, Jan. 9, 2009, doi: 10.1152/ajpheart.00496.2008, pp. H639-H644, [online], [retrieved on Oct. 7, 2020] Retrieved from the Internet <URL.http://www.ajpheart.org/journal/ajpheart.(096230.248.061)>.
(Continued)

*Primary Examiner* — Rebecca E Eisenberg
*Assistant Examiner* — Ted Yang
(74) *Attorney, Agent, or Firm* — Chang & Hale LLP

(57) ABSTRACT

A method of shunting blood involves accessing a left atrium of a heart with a surgical instrument, advancing the surgical instrument into a pulmonary vein fluidly coupled to the left atrium, forming an opening in a wall portion of the pulmonary vein, and shunting blood from the pulmonary vein into a right-side structure of the heart through the opening in the wall portion of the pulmonary vein.

24 Claims, 14 Drawing Sheets

(51) Int. Cl.
*A61B 18/14* (2006.01)
*A61F 2/86* (2013.01)
*A61M 29/00* (2006.01)

(52) U.S. Cl.
CPC .............. *A61B 2018/00577* (2013.01); *A61B 2018/00601* (2013.01); *A61B 2018/1412* (2013.01); *A61M 2210/125* (2013.01)

(58) Field of Classification Search
CPC ............ A61B 2018/1412; A61B 18/02; A61B 2017/1107; A61B 2018/00595; A61B 17/11; A61B 18/1492; A61B 2018/00357; A61B 2018/00386; A61B 2018/0212; A61M 27/002; A61M 29/00; A61M 2210/125; A61F 2/86; A61F 2/915; A61F 2220/0016
See application file for complete search history.

(56) References Cited

U.S. PATENT DOCUMENTS

| | | |
|---|---|---|
| 3,730,186 A | 5/1973 | Edmunds, Jr. et al. |
| 3,853,126 A | 12/1974 | Schulte |
| 3,882,862 A | 5/1975 | Berend |
| 3,882,882 A | 5/1975 | Preisig |
| 3,903,894 A | 9/1975 | Rosen et al. |
| 4,256,094 A | 3/1981 | Kapp et al. |
| 4,428,365 A | 1/1984 | Hakky |
| 4,556,050 A | 12/1985 | Hodgson et al. |
| 4,578,061 A | 3/1986 | Lemelson |
| 4,586,501 A | 5/1986 | Claracq |
| 4,601,718 A | 7/1986 | Possis et al. |
| 4,655,777 A | 4/1987 | Dunn et al. |
| 4,708,140 A | 11/1987 | Baron |
| 4,712,551 A | 12/1987 | Rayhanabad |
| 4,739,762 A | 4/1988 | Palmaz |
| 4,762,128 A | 8/1988 | Rosenbluth |
| 4,774,949 A | 10/1988 | Fogarty |
| 4,828,544 A | 5/1989 | Lane et al. |
| 4,861,336 A | 8/1989 | Helzel |
| 4,881,939 A | 11/1989 | Newman |
| 4,946,457 A | 8/1990 | Elliott |
| 4,950,227 A | 8/1990 | Savin et al. |
| 4,961,729 A | 10/1990 | Vaillancourt |
| 4,997,431 A | 3/1991 | Isner et al. |
| 5,026,377 A | 6/1991 | Burton et al. |
| 5,054,492 A | 10/1991 | Scribner et al. |
| 5,108,420 A | 4/1992 | Marks |
| 5,109,420 A | 4/1992 | Nonaka |
| 5,167,239 A | 12/1992 | Cohen et al. |
| 5,190,528 A | 3/1993 | Fonger et al. |
| 5,193,546 A | 3/1993 | Shaknovich |
| 5,201,757 A | 4/1993 | Heyn et al. |
| 5,242,397 A | 9/1993 | Barath et al. |
| 5,242,410 A | 9/1993 | Melker |
| 5,258,042 A | 11/1993 | Mehta |
| 5,267,940 A | 12/1993 | Moulder |
| 5,287,861 A | 2/1994 | Wilk |
| 5,330,496 A | 7/1994 | Alferness |
| 5,334,217 A | 8/1994 | Das |
| 5,345,940 A | 9/1994 | Seward et al. |
| 5,354,279 A | 10/1994 | Hofling |
| 5,366,490 A | 11/1994 | Edwards et al. |
| 5,373,849 A | 12/1994 | Maroney et al. |
| 5,419,777 A | 5/1995 | Hofling |
| 5,423,878 A | 6/1995 | Franz |
| 5,429,634 A | 7/1995 | Narciso, Jr. |
| 5,431,700 A | 7/1995 | Sloan |
| 5,443,497 A | 8/1995 | Venbrux |
| 5,445,600 A | 8/1995 | Abdulla |
| 5,445,646 A | 8/1995 | Euteneuer et al. |
| 5,456,284 A | 10/1995 | Ryan et al. |
| 5,456,712 A | 10/1995 | Maginot |
| 5,462,523 A | 10/1995 | Samson et al. |
| 5,464,395 A | 11/1995 | Faxon et al. |
| 5,491,224 A | 2/1996 | Bittner et al. |
| 5,496,311 A | 3/1996 | Abele et al. |
| 5,499,630 A | 3/1996 | Hiki et al. |
| 5,507,724 A | 4/1996 | Hofmann et al. |
| 5,507,725 A | 4/1996 | Savage et al. |
| 5,538,504 A | 7/1996 | Linden et al. |
| 5,551,954 A | 9/1996 | Buscemi et al. |
| 5,554,182 A | 9/1996 | Dinh et al. |
| 5,570,693 A | 11/1996 | Jang et al. |
| 5,571,086 A | 11/1996 | Kaplan et al. |
| 5,571,151 A | 11/1996 | Gregory |
| 5,588,960 A | 12/1996 | Edwards et al. |
| 5,597,378 A | 1/1997 | Jervis |
| 5,599,300 A | 2/1997 | Weaver et al. |
| 5,614,204 A | 3/1997 | Cochrum |
| 5,628,784 A | 5/1997 | Strecker |
| 5,661,133 A | 8/1997 | Leiden et al. |
| 5,662,609 A | 9/1997 | Slepian |
| 5,662,711 A | 9/1997 | Douglas |
| 5,665,077 A | 9/1997 | Rosen et al. |
| 5,669,880 A | 9/1997 | Solar |
| 5,682,906 A | 11/1997 | Sterman et al. |
| 5,690,670 A | 11/1997 | Davidson |
| 5,693,029 A | 12/1997 | Leonhardt |
| 5,704,361 A | 1/1998 | Seward et al. |
| 5,704,926 A | 1/1998 | Sutton |
| 5,713,363 A | 2/1998 | Seward et al. |
| 5,713,853 A | 2/1998 | Clark et al. |
| 5,718,725 A | 2/1998 | Sterman et al. |
| 5,724,975 A | 3/1998 | Negus et al. |
| 5,724,977 A | 3/1998 | Yock et al. |
| 5,728,123 A | 3/1998 | Lemelson et al. |
| 5,735,847 A | 4/1998 | Gough et al. |
| 5,738,658 A | 4/1998 | Maus et al. |
| 5,743,874 A | 4/1998 | Fischell et al. |
| 5,755,682 A | 5/1998 | Knudson et al. |
| 5,756,696 A | 5/1998 | Gray et al. |
| 5,771,895 A | 6/1998 | Slager |
| 5,772,629 A | 6/1998 | Kaplan |
| 5,772,632 A | 6/1998 | Forman |
| 5,807,258 A | 9/1998 | Cimochowski et al. |
| 5,807,306 A | 9/1998 | Shapland et al. |
| 5,810,780 A | 9/1998 | Brimhall et al. |
| 5,814,005 A | 9/1998 | Barra et al. |
| 5,827,216 A | 10/1998 | Igo et al. |
| 5,830,222 A | 11/1998 | Makower |
| 5,830,224 A | 11/1998 | Cohn et al. |
| 5,836,913 A | 11/1998 | Orth et al. |
| 5,843,090 A | 12/1998 | Schuetz |
| 5,843,170 A | 12/1998 | Ahn |
| 5,944,738 A | 8/1999 | Amplatz et al. |
| 5,951,569 A | 9/1999 | Tuckey et al. |
| 5,989,280 A | 11/1999 | Euteneuer et al. |
| 6,019,788 A | 2/2000 | Butters et al. |
| 6,042,589 A | 3/2000 | Marianne |
| 6,053,891 A | 4/2000 | DeCampli |
| 6,081,738 A | 6/2000 | Hinohara et al. |
| 6,086,553 A | 7/2000 | Akbik |
| 6,092,526 A | 7/2000 | LaFontaine et al. |
| 6,095,878 A | 8/2000 | Van Balen |
| 6,113,612 A | 9/2000 | Swanson et al. |
| 6,120,494 A | 9/2000 | Jonkman |
| 6,120,522 A | 9/2000 | Vrba et al. |
| 6,120,534 A | 9/2000 | Ruiz |
| 6,152,937 A | 11/2000 | Peterson et al. |
| 6,165,185 A | 12/2000 | Shennib et al. |
| 6,168,620 B1 | 1/2001 | Kerr |
| 6,168,820 B1 | 1/2001 | Garwood et al. |
| 6,174,681 B1 | 1/2001 | Halling et al. |
| 6,190,353 B1 | 2/2001 | Makower et al. |
| 6,193,734 B1 | 2/2001 | Bolduc et al. |
| 6,196,230 B1 | 3/2001 | Hall et al. |
| 6,241,743 B1 | 6/2001 | Levin et al. |
| 6,248,117 B1 | 6/2001 | Blatter |
| 6,251,116 B1 | 6/2001 | Shennib et al. |
| 6,254,631 B1 | 7/2001 | Thompson |
| 6,280,412 B1 | 8/2001 | Pederson, Jr. et al. |
| 6,283,951 B1 | 9/2001 | Flaherty et al. |

(56) References Cited

U.S. PATENT DOCUMENTS

| | | |
|---|---|---|
| 6,287,332 B1 | 9/2001 | Bolz et al. |
| 6,290,728 B1 | 9/2001 | Phelps et al. |
| 6,302,875 B1 | 10/2001 | Makower et al. |
| 6,302,892 B1 | 10/2001 | Wilk |
| 6,302,905 B1 | 10/2001 | Goldsteen et al. |
| 6,309,415 B1 | 10/2001 | Pulnev et al. |
| 6,315,752 B1 | 11/2001 | DiMatteo |
| 6,325,798 B1 | 12/2001 | Edwards et al. |
| 6,361,545 B1 | 3/2002 | Macoviak et al. |
| 6,375,615 B1 | 4/2002 | Flaherty et al. |
| 6,387,116 B1 | 5/2002 | McKenzie et al. |
| 6,387,119 B2 | 5/2002 | Wolf et al. |
| 6,391,036 B1 | 5/2002 | Berg et al. |
| 6,402,767 B1 | 6/2002 | Nash et al. |
| 6,443,158 B1 | 9/2002 | LaFontaine et al. |
| 6,451,048 B1 | 9/2002 | Berg et al. |
| 6,458,140 B2 | 10/2002 | Akin et al. |
| 6,464,665 B1 | 10/2002 | Heuser |
| 6,468,303 B1 | 10/2002 | Amplatz et al. |
| 6,475,226 B1 | 11/2002 | Belef et al. |
| 6,494,889 B1 | 12/2002 | Fleischman et al. |
| 6,503,247 B2 | 1/2003 | Swartz et al. |
| 6,506,201 B2 | 1/2003 | Di Caprio et al. |
| 6,508,824 B1 | 1/2003 | Flaherty et al. |
| 6,561,998 B1 | 5/2003 | Roth et al. |
| 6,562,066 B1 | 5/2003 | Martin |
| 6,565,542 B2 | 5/2003 | Kumar et al. |
| 6,575,168 B2 | 6/2003 | LaFontaine et al. |
| 6,579,311 B1 | 6/2003 | Makower |
| 6,589,251 B2 | 7/2003 | Yee et al. |
| 6,595,941 B1 | 7/2003 | Blatter |
| 6,602,241 B2 | 8/2003 | Makower et al. |
| 6,613,074 B1 | 9/2003 | Mitelberg et al. |
| 6,616,624 B1 | 9/2003 | Kieval |
| 6,616,675 B1 | 9/2003 | Evard et al. |
| 6,620,202 B2 | 9/2003 | Bottcher et al. |
| 6,623,494 B1 | 9/2003 | Blatter |
| 6,626,920 B2 | 9/2003 | Whayne |
| 6,638,293 B1 | 10/2003 | Makower et al. |
| 6,692,482 B2 | 2/2004 | Heller et al. |
| 6,695,878 B2 | 2/2004 | McGuckin, Jr. et al. |
| 6,699,256 B1 | 3/2004 | Logan et al. |
| 6,702,828 B2 | 3/2004 | Whayne |
| 6,709,414 B2 | 3/2004 | Weitzel et al. |
| 6,709,444 B1 | 3/2004 | Makower |
| 6,712,836 B1 | 3/2004 | Berg et al. |
| 6,719,804 B2 | 4/2004 | St. Pierre |
| 6,726,659 B1 | 4/2004 | Stocking et al. |
| 6,726,677 B1 | 4/2004 | Flaherty et al. |
| 6,736,825 B2 | 5/2004 | Blatter et al. |
| 6,740,426 B2 | 5/2004 | Kawachi et al. |
| 6,743,244 B2 | 6/2004 | Blatter et al. |
| 6,743,259 B2 | 6/2004 | Ginn |
| 6,746,426 B1 | 6/2004 | Flaherty et al. |
| 6,748,484 B1 | 6/2004 | Henderson et al. |
| 6,758,854 B1 | 7/2004 | Butler et al. |
| 6,776,785 B1 | 8/2004 | Yencho et al. |
| 6,797,083 B2 | 9/2004 | Peterson |
| 6,802,858 B2 | 10/2004 | Gambale et al. |
| 6,805,706 B2 | 10/2004 | Solovay et al. |
| 6,808,498 B2 | 10/2004 | Laroya et al. |
| 6,827,698 B1 | 12/2004 | Kleinekofort |
| 6,847,348 B2 | 1/2005 | Rojewski |
| 6,854,172 B2 | 2/2005 | Kaese et al. |
| 6,858,035 B2 | 2/2005 | Whayne |
| 6,869,437 B1 | 3/2005 | Hausen et al. |
| 6,893,413 B2 | 5/2005 | Martin |
| 6,913,600 B2 | 7/2005 | Valley et al. |
| 6,913,607 B2 | 7/2005 | Ainsworth et al. |
| 6,915,154 B1 | 7/2005 | Docherty et al. |
| 6,926,690 B2 | 8/2005 | Renati |
| 6,972,023 B2 | 12/2005 | Whayne et al. |
| 6,979,351 B2 | 12/2005 | Forsell et al. |
| 6,985,774 B2 | 1/2006 | Kieval et al. |
| 7,002,491 B2 | 2/2006 | Robbins |
| 7,008,397 B2 | 3/2006 | Tweden et al. |
| 7,011,094 B2 | 3/2006 | Rapacki et al. |
| 7,011,678 B2 | 3/2006 | Tenerz et al. |
| 7,025,741 B2 | 4/2006 | Cull |
| 7,025,746 B2 | 4/2006 | Tal |
| 7,037,329 B2 | 5/2006 | Martin |
| 7,056,294 B2 | 6/2006 | Khairkhahan et al. |
| 7,056,320 B2 | 6/2006 | Utley et al. |
| 7,056,325 B1 | 6/2006 | Makower et al. |
| 7,077,860 B2 | 7/2006 | Yan et al. |
| 7,083,631 B2 | 8/2006 | Houser et al. |
| 7,108,701 B2 | 9/2006 | Evens et al. |
| 7,115,136 B2 | 10/2006 | Park et al. |
| 7,118,546 B2 | 10/2006 | Blatter |
| 7,128,750 B1 | 10/2006 | Stergiopulos |
| 7,175,644 B2 | 2/2007 | Cooper et al. |
| 7,182,771 B1 | 2/2007 | Houser et al. |
| 7,235,095 B2 | 6/2007 | Haverkost et al. |
| 7,294,115 B1 | 11/2007 | Wilk |
| 7,316,706 B2 | 1/2008 | Bloom et al. |
| 7,317,951 B2 | 1/2008 | Schneider et al. |
| 7,318,804 B2 | 1/2008 | Weitzel et al. |
| 7,326,221 B2 | 2/2008 | Sakamoto et al. |
| 7,331,985 B2 | 2/2008 | Thompson et al. |
| 7,335,220 B2 | 2/2008 | Khosravi et al. |
| 7,351,247 B2 | 4/2008 | Kupiecki et al. |
| 7,361,181 B2 | 4/2008 | Hindrichs et al. |
| 7,374,567 B2 | 5/2008 | Heuser |
| D581,054 S | 11/2008 | Moore |
| 7,462,162 B2 | 12/2008 | Phan et al. |
| 7,476,200 B2 | 1/2009 | Tal |
| 7,530,963 B2 | 5/2009 | Albright |
| 7,563,277 B2 | 7/2009 | Case et al. |
| 7,623,926 B2 | 11/2009 | Rossing et al. |
| 7,625,593 B2 | 12/2009 | Mandrusov et al. |
| 7,628,768 B2 | 12/2009 | Faul et al. |
| D612,499 S | 3/2010 | Ondracek et al. |
| 7,691,110 B2 | 4/2010 | Secrest et al. |
| 7,699,863 B2 | 4/2010 | Marco et al. |
| 7,722,549 B2 | 5/2010 | Nakao |
| 7,722,665 B2 | 5/2010 | Anwar et al. |
| 7,744,621 B2 | 6/2010 | Paul et al. |
| 7,780,686 B2 | 8/2010 | Park et al. |
| 7,794,495 B2 | 9/2010 | Gale et al. |
| 7,807,191 B2 | 10/2010 | Iyer et al. |
| 7,815,590 B2 | 10/2010 | Cooper |
| 7,815,656 B2 | 10/2010 | Rust et al. |
| 7,815,852 B2 | 10/2010 | Sternby |
| 7,828,814 B2 | 11/2010 | Brenneman et al. |
| 7,846,179 B2 | 12/2010 | Belef et al. |
| 7,846,194 B2 | 12/2010 | Hartley et al. |
| 7,850,705 B2 | 12/2010 | Bachinski et al. |
| 7,867,547 B2 | 1/2011 | Tochterman et al. |
| 7,879,367 B2 | 2/2011 | Heublein et al. |
| 7,892,246 B2 | 2/2011 | Akin et al. |
| 7,892,247 B2 | 2/2011 | Conston et al. |
| 7,923,022 B2 | 4/2011 | Wang et al. |
| 7,951,194 B2 | 5/2011 | Gueriguian et al. |
| 7,959,603 B2 | 6/2011 | Wahr et al. |
| 7,964,210 B2 | 6/2011 | Wang et al. |
| 7,967,769 B2 | 6/2011 | Faul et al. |
| 7,972,346 B2 | 7/2011 | Bachmann et al. |
| 8,002,821 B2 | 8/2011 | Stinson |
| 8,016,782 B2 | 9/2011 | Brenneman et al. |
| 8,029,470 B2 | 10/2011 | Whiting et al. |
| 8,048,150 B2 | 11/2011 | Weber et al. |
| 8,052,751 B2 | 11/2011 | Aklog et al. |
| 8,057,534 B2 | 11/2011 | Boismier et al. |
| 8,070,708 B2 | 12/2011 | Rottenberg et al. |
| 8,088,171 B2 | 1/2012 | Brenneman |
| 8,089,029 B2 | 1/2012 | Flanagan |
| 8,091,556 B2 | 1/2012 | Keren et al. |
| 8,128,689 B2 | 3/2012 | Weber et al. |
| 8,152,773 B2 | 4/2012 | Albrecht et al. |
| 8,182,527 B2 | 5/2012 | Llanos et al. |
| 8,214,015 B2 | 7/2012 | Macaulay et al. |
| 8,221,495 B2 | 7/2012 | Shrivastava et al. |
| 8,226,592 B2 | 7/2012 | Brenneman et al. |
| D665,500 S | 8/2012 | Martin et al. |

(56) References Cited

U.S. PATENT DOCUMENTS

| | | |
|---|---|---|
| 8,282,591 B2 | 10/2012 | Khan et al. |
| 8,308,682 B2 | 11/2012 | Kramer et al. |
| 8,357,193 B2 | 1/2013 | Phan et al. |
| 8,376,979 B2 | 2/2013 | Kapadia |
| 8,382,697 B2 | 2/2013 | Brenneman et al. |
| D679,015 S | 3/2013 | Nakaji |
| 8,409,167 B2 | 4/2013 | Roschak |
| 8,500,697 B2 | 8/2013 | Kurth et al. |
| 8,506,984 B2 | 8/2013 | Cook et al. |
| 8,518,062 B2 | 8/2013 | Cole et al. |
| 8,518,662 B2 | 8/2013 | Ritzen et al. |
| 8,545,552 B2 | 10/2013 | Garrison et al. |
| 8,641,724 B2 | 2/2014 | Brenneman et al. |
| 8,657,790 B2 | 2/2014 | Tal et al. |
| 8,696,611 B2 | 4/2014 | Nitzan et al. |
| D705,427 S | 5/2014 | Jagger et al. |
| 8,768,487 B2 | 7/2014 | Farnan et al. |
| 8,784,860 B2 | 7/2014 | Falotico et al. |
| 8,882,830 B2 | 11/2014 | Cartledge et al. |
| 8,920,449 B2 | 12/2014 | Wilkinson |
| 8,926,545 B2 | 1/2015 | Brenneman et al. |
| 8,932,341 B2 | 1/2015 | Brenneman |
| D723,166 S | 2/2015 | Igaki et al. |
| 8,951,223 B2 | 2/2015 | McNamara et al. |
| 8,951,276 B2 | 2/2015 | Kellerman et al. |
| 9,005,155 B2 | 4/2015 | Sugimoto |
| 9,044,588 B2 | 6/2015 | Conn |
| 9,061,115 B2 | 6/2015 | Ward et al. |
| 9,067,050 B2 | 6/2015 | Gallagher et al. |
| 9,198,756 B2 | 12/2015 | Aklog et al. |
| 9,232,997 B2 | 1/2016 | Sugimoto et al. |
| 9,277,995 B2 | 3/2016 | Celermajer et al. |
| 9,345,485 B2 | 5/2016 | Dakin et al. |
| 9,439,746 B2 | 9/2016 | Bell et al. |
| 9,456,812 B2 | 10/2016 | Finch et al. |
| 9,550,022 B2 | 1/2017 | Brenneman et al. |
| 9,649,480 B2 | 5/2017 | Sugimoto et al. |
| 9,681,948 B2 | 6/2017 | Levi et al. |
| 9,693,800 B2 | 7/2017 | Aman et al. |
| 9,775,636 B2 | 10/2017 | Fazio et al. |
| 9,789,294 B2 | 10/2017 | Taft et al. |
| 9,814,483 B2 | 11/2017 | Vardi |
| 9,827,404 B2 | 11/2017 | Nance et al. |
| 9,839,517 B2 | 12/2017 | Centola et al. |
| 9,872,981 B2 | 1/2018 | Sparks et al. |
| 9,980,815 B2 | 5/2018 | Nitzan et al. |
| 10,039,905 B1 | 8/2018 | Taft et al. |
| 10,076,403 B1 | 9/2018 | Eigler et al. |
| 10,130,371 B2 | 11/2018 | Dehdashtian et al. |
| 10,232,098 B2 | 3/2019 | Brenneman et al. |
| 10,272,230 B2 | 4/2019 | Malek et al. |
| 10,292,690 B2 | 5/2019 | Celermajer et al. |
| 10,327,746 B2 | 6/2019 | Glimsdale et al. |
| 10,413,284 B2 | 9/2019 | McNamara et al. |
| 10,426,482 B2 | 10/2019 | Rafiee et al. |
| 10,426,497 B2 | 10/2019 | Chou et al. |
| 10,433,851 B2 | 10/2019 | Adams et al. |
| 10,456,259 B2 | 10/2019 | Subramanian et al. |
| 10,543,113 B2 | 1/2020 | Vong et al. |
| 10,561,423 B2 | 2/2020 | Sharma |
| 10,565,835 B2 | 2/2020 | Harrington et al. |
| 10,568,751 B2 | 2/2020 | McNamara |
| 10,595,999 B2 | 3/2020 | Vettukattil et al. |
| 10,709,451 B2 | 7/2020 | Gronberg et al. |
| 10,835,394 B2 | 11/2020 | Nae et al. |
| 10,898,698 B1 | 1/2021 | Eigler et al. |
| 10,925,731 B2 | 2/2021 | Bishop et al. |
| 10,925,756 B2 | 2/2021 | Perszyk |
| 10,940,296 B2 | 3/2021 | Keren |
| 11,135,054 B2 | 10/2021 | Nitzan et al. |
| 11,135,410 B2 | 10/2021 | Finch et al. |
| 11,234,702 B1 | 2/2022 | Eigler et al. |
| 11,291,807 B2 | 4/2022 | Eigler et al. |
| 11,298,117 B2 | 4/2022 | Hariton et al. |
| 11,304,698 B2 | 4/2022 | Sharma |
| 11,395,644 B2 | 7/2022 | Alanbaei |
| 11,420,034 B2 | 8/2022 | Solomon et al. |
| 2001/0000041 A1 | 3/2001 | Selmon et al. |
| 2001/0025643 A1 | 10/2001 | Foley |
| 2001/0045698 A1 | 11/2001 | Lo |
| 2002/0013616 A1 | 1/2002 | Carter et al. |
| 2002/0029079 A1 | 3/2002 | Kim et al. |
| 2002/0062146 A1 | 5/2002 | Makower et al. |
| 2002/0169466 A1 | 11/2002 | Peterson et al. |
| 2002/0193751 A1 | 12/2002 | Theeuwes et al. |
| 2003/0017150 A1 | 1/2003 | Torphy |
| 2003/0060876 A1 | 3/2003 | Loshakove et al. |
| 2003/0065345 A1 | 4/2003 | Weadock |
| 2003/0120292 A1 | 6/2003 | Park et al. |
| 2003/0181928 A1 | 9/2003 | Vidlund et al. |
| 2003/0225425 A1 | 12/2003 | Kupiecki et al. |
| 2004/0064081 A1 | 4/2004 | Stanish |
| 2004/0087984 A1 | 5/2004 | Kupiecki et al. |
| 2004/0087997 A1 | 5/2004 | Brenneman |
| 2004/0092879 A1 | 5/2004 | Kraus et al. |
| 2004/0098105 A1 | 5/2004 | Stinson et al. |
| 2004/0215168 A1 | 10/2004 | Verrier et al. |
| 2004/0215220 A1 | 10/2004 | Dolan et al. |
| 2004/0215323 A1 | 10/2004 | Stiger |
| 2004/0230156 A1 | 11/2004 | Schreck et al. |
| 2004/0249335 A1 | 12/2004 | Faul et al. |
| 2004/0260318 A1 | 12/2004 | Hunter et al. |
| 2005/0021085 A1 | 1/2005 | Abrams et al. |
| 2005/0038501 A1 | 2/2005 | Moore et al. |
| 2005/0043708 A1 | 2/2005 | Gleeson et al. |
| 2005/0049675 A1 | 3/2005 | Wallace |
| 2005/0060041 A1 | 3/2005 | Phan et al. |
| 2005/0075655 A1 | 4/2005 | Bumbalough et al. |
| 2005/0075656 A1 | 4/2005 | Beaupre |
| 2005/0082226 A1 | 4/2005 | Bene et al. |
| 2005/0107723 A1 | 5/2005 | Wehman et al. |
| 2005/0149096 A1 | 7/2005 | Hilal et al. |
| 2005/0165344 A1 | 7/2005 | Dobak |
| 2005/0228402 A1 | 10/2005 | Hofmann |
| 2005/0249770 A1 | 11/2005 | Hunter |
| 2005/0249776 A1 | 11/2005 | Chen et al. |
| 2005/0272806 A1 | 12/2005 | Falotico et al. |
| 2006/0024359 A1 | 2/2006 | Walker et al. |
| 2006/0034466 A1 | 2/2006 | Form et al. |
| 2006/0047337 A1 | 3/2006 | Brenneman |
| 2006/0111704 A1 | 5/2006 | Brenneman et al. |
| 2006/0130591 A1 | 6/2006 | Perkins |
| 2006/0130767 A1 | 6/2006 | Herchen |
| 2006/0182536 A1 | 8/2006 | Rice et al. |
| 2006/0198869 A1 | 9/2006 | Furst et al. |
| 2006/0241342 A1 | 10/2006 | Macaulay et al. |
| 2006/0264801 A1 | 11/2006 | Bolling et al. |
| 2006/0264986 A1 | 11/2006 | Park et al. |
| 2006/0271196 A1 | 11/2006 | Saal et al. |
| 2006/0293701 A1 | 12/2006 | Ainsworth et al. |
| 2007/0083258 A1 | 4/2007 | Falotico et al. |
| 2007/0173787 A1 | 7/2007 | Huang et al. |
| 2007/0179426 A1 | 8/2007 | Selden |
| 2007/0213750 A1 | 9/2007 | Weadock |
| 2008/0021485 A1 | 1/2008 | Catanese et al. |
| 2008/0051883 A1 | 2/2008 | Llanos et al. |
| 2008/0091264 A1 | 4/2008 | Machold et al. |
| 2008/0109069 A1 | 5/2008 | Coleman et al. |
| 2008/0161904 A1 | 7/2008 | Heuser et al. |
| 2008/0167595 A1 | 7/2008 | Porter et al. |
| 2008/0234842 A1 | 9/2008 | Zhang |
| 2009/0125097 A1 | 5/2009 | Bruszewski et al. |
| 2009/0143713 A1 | 6/2009 | Van Dam et al. |
| 2009/0149947 A1 | 6/2009 | Frohwitter |
| 2009/0187116 A1 | 7/2009 | Noishiki et al. |
| 2009/0281379 A1 | 11/2009 | Binmoeller et al. |
| 2010/0030321 A1 | 2/2010 | Mach |
| 2010/0106171 A1 | 4/2010 | Arepally et al. |
| 2010/0198041 A1 | 8/2010 | Christian et al. |
| 2010/0217382 A1 | 8/2010 | Chau et al. |
| 2010/0268316 A1 | 10/2010 | Brenneman et al. |
| 2010/0298930 A1 | 11/2010 | Orlov |
| 2011/0096036 A1 | 4/2011 | McIntosh et al. |
| 2011/0106118 A1 | 5/2011 | Son et al. |

(56) References Cited

U.S. PATENT DOCUMENTS

| | | |
|---|---|---|
| 2011/0251482 A1 | 10/2011 | Kellerman et al. |
| 2011/0270243 A1* | 11/2011 | Skarda ............... A61B 18/1482 606/41 |
| 2012/0041544 A1 | 2/2012 | Wolf |
| 2012/0053686 A1 | 3/2012 | McNamara et al. |
| 2012/0143141 A1 | 6/2012 | Verkaik et al. |
| 2012/0265229 A1 | 10/2012 | Rottenberg et al. |
| 2013/0022214 A1 | 1/2013 | Dickins et al. |
| 2013/0030521 A1 | 1/2013 | Nitzan et al. |
| 2013/0178784 A1 | 7/2013 | McNamara et al. |
| 2013/0253342 A1 | 9/2013 | Griswold et al. |
| 2013/0281988 A1 | 10/2013 | Magnin et al. |
| 2014/0183828 A1 | 7/2014 | Xu et al. |
| 2014/0203939 A1 | 7/2014 | Harrington et al. |
| 2014/0222040 A1 | 8/2014 | Park et al. |
| 2014/0228733 A1* | 8/2014 | Martinez ............... A61B 17/11 604/8 |
| 2014/0276395 A1 | 9/2014 | Wilson et al. |
| 2014/0277054 A1 | 9/2014 | McNamara et al. |
| 2014/0278442 A1 | 9/2014 | Hong et al. |
| 2015/0119796 A1 | 4/2015 | Finch |
| 2015/0148731 A1 | 5/2015 | Mcnamara et al. |
| 2015/0151101 A1 | 6/2015 | Bonnette et al. |
| 2015/0238729 A1 | 8/2015 | Jenson et al. |
| 2016/0022293 A1 | 1/2016 | Dubrul et al. |
| 2016/0022970 A1 | 1/2016 | Forcucci et al. |
| 2016/0058452 A1 | 3/2016 | Brenneman et al. |
| 2016/0120550 A1 | 5/2016 | McNamara et al. |
| 2016/0220357 A1 | 8/2016 | Anand et al. |
| 2016/0270810 A1 | 9/2016 | Vardi et al. |
| 2016/0296317 A1 | 10/2016 | Timmermans et al. |
| 2016/0323977 A1 | 11/2016 | Sun et al. |
| 2017/0090865 A1 | 3/2017 | Armstrong-Muntner et al. |
| 2017/0113026 A1 | 4/2017 | Finch |
| 2017/0128705 A1 | 5/2017 | Forcucci et al. |
| 2017/0281339 A1 | 10/2017 | Levi et al. |
| 2017/0303959 A1 | 10/2017 | Feng et al. |
| 2017/0319823 A1 | 11/2017 | Yacoby et al. |
| 2017/0340460 A1 | 11/2017 | Rosen et al. |
| 2018/0177516 A1 | 6/2018 | Vardi et al. |
| 2019/0008628 A1 | 1/2019 | Eigler et al. |
| 2019/0015104 A1* | 1/2019 | Tuseth ............... A61M 60/523 |
| 2019/0070349 A1* | 3/2019 | Whisenant .......... A61M 27/002 |
| 2019/0083076 A1* | 3/2019 | Alanbaei ............ A61B 17/0057 |
| 2019/0216603 A1* | 7/2019 | Orlov .................... A61B 17/00 |
| 2019/0269392 A1 | 9/2019 | Celermajer et al. |
| 2019/0298909 A1 | 10/2019 | Cully et al. |
| 2020/0054867 A1 | 2/2020 | Schwartz et al. |
| 2020/0085600 A1 | 3/2020 | Schwartz et al. |
| 2020/0101270 A1 | 4/2020 | Sutherland |
| 2020/0170662 A1 | 6/2020 | Vardi et al. |
| 2020/0187945 A1* | 6/2020 | Rowe ............... A61B 17/00234 |
| 2020/0254228 A1 | 8/2020 | Taft et al. |
| 2020/0261704 A1 | 8/2020 | Wang et al. |
| 2020/0289196 A1 | 9/2020 | Arevalos et al. |
| 2020/0315599 A1 | 10/2020 | Nae et al. |
| 2020/0368505 A1 | 11/2020 | Nae et al. |
| 2020/0391016 A1 | 12/2020 | Passman et al. |
| 2021/0007790 A1 | 1/2021 | Takahashi et al. |
| 2021/0007791 A1 | 1/2021 | Takahashi et al. |
| 2021/0007800 A1 | 1/2021 | Takahashi et al. |
| 2021/0045691 A1 | 2/2021 | Zou et al. |
| 2021/0059650 A1 | 3/2021 | Eidenschink et al. |
| 2021/0077186 A1 | 3/2021 | Pate et al. |
| 2021/0085935 A1 | 3/2021 | Fahey et al. |
| 2021/0092522 A1 | 3/2021 | Draper et al. |
| 2021/0121179 A1 | 4/2021 | Ben-David et al. |
| 2021/0153776 A1 | 5/2021 | Minar et al. |
| 2021/0161637 A1 | 6/2021 | Eigler et al. |
| 2021/0177508 A1 | 6/2021 | Kellerman |
| 2021/0236138 A1 | 8/2021 | Perszyk et al. |
| 2021/0290214 A1 | 9/2021 | Cole et al. |
| 2021/0369321 A1 | 12/2021 | Yang et al. |
| 2021/0401494 A1 | 12/2021 | Passman et al. |
| 2022/0001154 A1 | 1/2022 | Rowe et al. |
| 2022/0008014 A1 | 1/2022 | Rowe et al. |
| 2022/0031327 A1 | 2/2022 | Manash et al. |
| 2022/0039667 A1 | 2/2022 | Schmitt et al. |
| 2022/0039671 A1 | 2/2022 | Fahey |
| 2022/0039833 A1 | 2/2022 | Thai et al. |
| 2022/0088355 A1 | 3/2022 | Rabito et al. |
| 2022/0096087 A1 | 3/2022 | Valdez |
| 2022/0110679 A1 | 4/2022 | Wang et al. |
| 2022/0142652 A1 | 5/2022 | Alexander et al. |
| 2022/0151784 A1 | 5/2022 | Eigler et al. |
| 2022/0168015 A1 | 6/2022 | Murray et al. |
| 2022/0184356 A1 | 6/2022 | Nae et al. |
| 2022/0202443 A1 | 6/2022 | Thai et al. |
| 2022/0203078 A1 | 6/2022 | May |
| 2022/0211380 A1 | 7/2022 | Pate |
| 2022/0218352 A1 | 7/2022 | O'Halloran et al. |
| 2022/0218964 A1 | 7/2022 | Fahey et al. |
| 2022/0241564 A1 | 8/2022 | Shang et al. |
| 2022/0241565 A1 | 8/2022 | Nae et al. |
| 2022/0257904 A1 | 8/2022 | Passman et al. |
| 2022/0273279 A1 | 9/2022 | Valdez et al. |
| 2022/0280160 A1 | 9/2022 | Sharma |
| 2022/0280760 A1 | 9/2022 | Thai et al. |
| 2022/0296865 A1 | 9/2022 | Rafiee et al. |
| 2022/0313234 A1 | 10/2022 | Mcnamara et al. |
| 2022/0323012 A1 | 10/2022 | Pool et al. |
| 2022/0323196 A1 | 10/2022 | Rafiee et al. |
| 2022/0346936 A1 | 11/2022 | Scutti et al. |
| 2022/0347446 A1* | 11/2022 | Fahey ............... A61B 17/0057 |
| 2022/0370120 A1 | 11/2022 | Yang et al. |
| 2022/0379100 A1 | 12/2022 | Gutierrez et al. |
| 2022/0387009 A1 | 12/2022 | Bukhdruker et al. |
| 2023/0099410 A1 | 3/2023 | Primeaux |
| 2023/0165672 A1* | 6/2023 | Fahey ....................... A61F 2/06 623/1.15 |
| 2023/0181214 A1 | 6/2023 | Vardi et al. |
| 2023/0191093 A1 | 6/2023 | Nae et al. |
| 2023/0263949 A1 | 8/2023 | Passman et al. |
| 2023/0285133 A1 | 9/2023 | Eigler et al. |
| 2023/0330398 A1 | 10/2023 | Nae et al. |

FOREIGN PATENT DOCUMENTS

| | | | |
|---|---|---|---|
| WO | WO-2020251700 A1 * | 12/2020 | ............. A61B 17/11 |
| WO | 2021091566 A1 | 5/2021 | |
| WO | 2022031317 A1 | 2/2022 | |
| WO | 2022060630 A1 | 3/2022 | |
| WO | 2022133070 A1 | 6/2022 | |
| WO | 2022169865 A1 | 8/2022 | |
| WO | 2022177737 A1 | 8/2022 | |
| WO | 2022197454 A1 | 9/2022 | |
| WO | 2022197455 A1 | 9/2022 | |
| WO | 2022232133 A1 | 11/2022 | |
| WO | 2022246158 A1 | 11/2022 | |
| WO | 2022246166 A1 | 11/2022 | |
| WO | 2022271473 A1 | 12/2022 | |
| WO | 2023022883 A1 | 2/2023 | |
| WO | 2023027926 A1 | 3/2023 | |
| WO | 2023079498 A1 | 5/2023 | |
| WO | 2023081127 A1 | 5/2023 | |
| WO | 2023081129 A1 | 5/2023 | |
| WO | 2023154235 A1 | 8/2023 | |
| WO | 2023154308 A1 | 8/2023 | |
| WO | 2023172435 A1 | 9/2023 | |
| WO | 2023172436 A1 | 9/2023 | |
| WO | 2023196243 A1 | 10/2023 | |
| WO | 2023239784 A1 | 12/2023 | |
| WO | 2023239785 A1 | 12/2023 | |
| WO | 2023239788 A2 | 12/2023 | |

OTHER PUBLICATIONS

Weimar et al., "Impact of Differential Right-to-Left Shunting on Systemic Perfusion in Pulmonary Arterial Hypertension", NIH Public Access Author Manuscript, Catherer Cardiovasc Interv., Apr. 2013, vol. 81, No. 5, pp. 888-895, doi: 10.1002/ccd.24458, National Institute of Health, Bethesda, Maryland.

(56) References Cited

OTHER PUBLICATIONS

Emil Mantini, MD, et al., Title: Congenital Anomalies Involving the Coronary Sinus, Circulation, Journal of the American Heart Association, vol. XXXIII, Feb. 1966, pp. 317-327.
Kong, et al.—Creation Of An Intra-atrial Communication With A New Amplatzer Shunt Prosthesis, Catheterization and Cardiovascular Interventions 56:267-271 (2002).
P.K. Kong, et al., Title: Unroofed Coronary Sinus and Persistent Left Superior Vena Cava, The European Society of Cardiology, 2006, pp. 398401.
Ruebben et al., "Arteriovenous fistulas induced by femoral arterial catheterization: percutaneous treatment," Radiology, 209:729, 1998.
Vandhana Scheller, et al., Title: Coronary Sinus to Left Atrial Communication, Case Report in Medicine, Ohio Heart and Vascular Center, vol. 2009, Article ID 790715, pp. 13.

\* cited by examiner

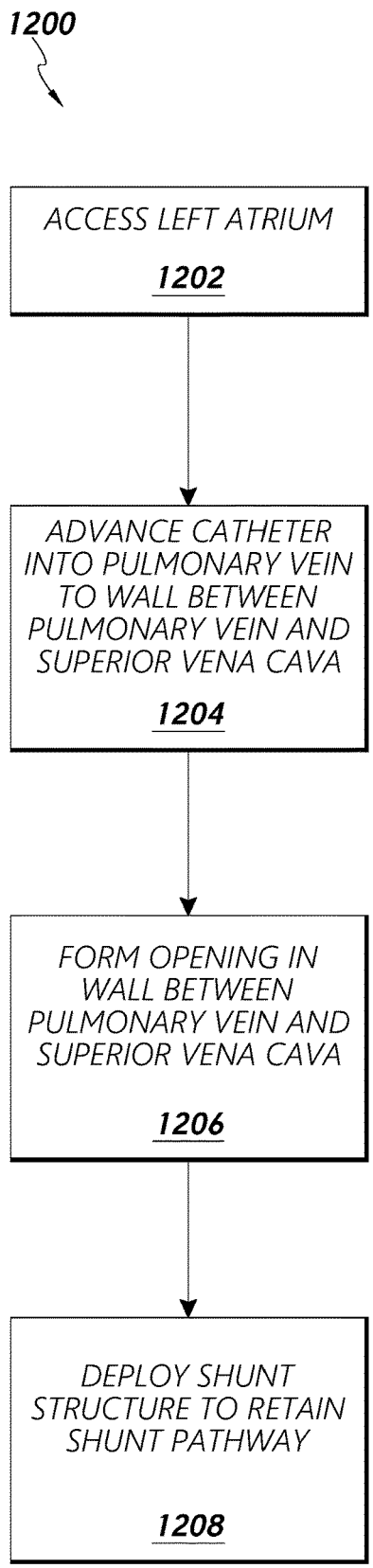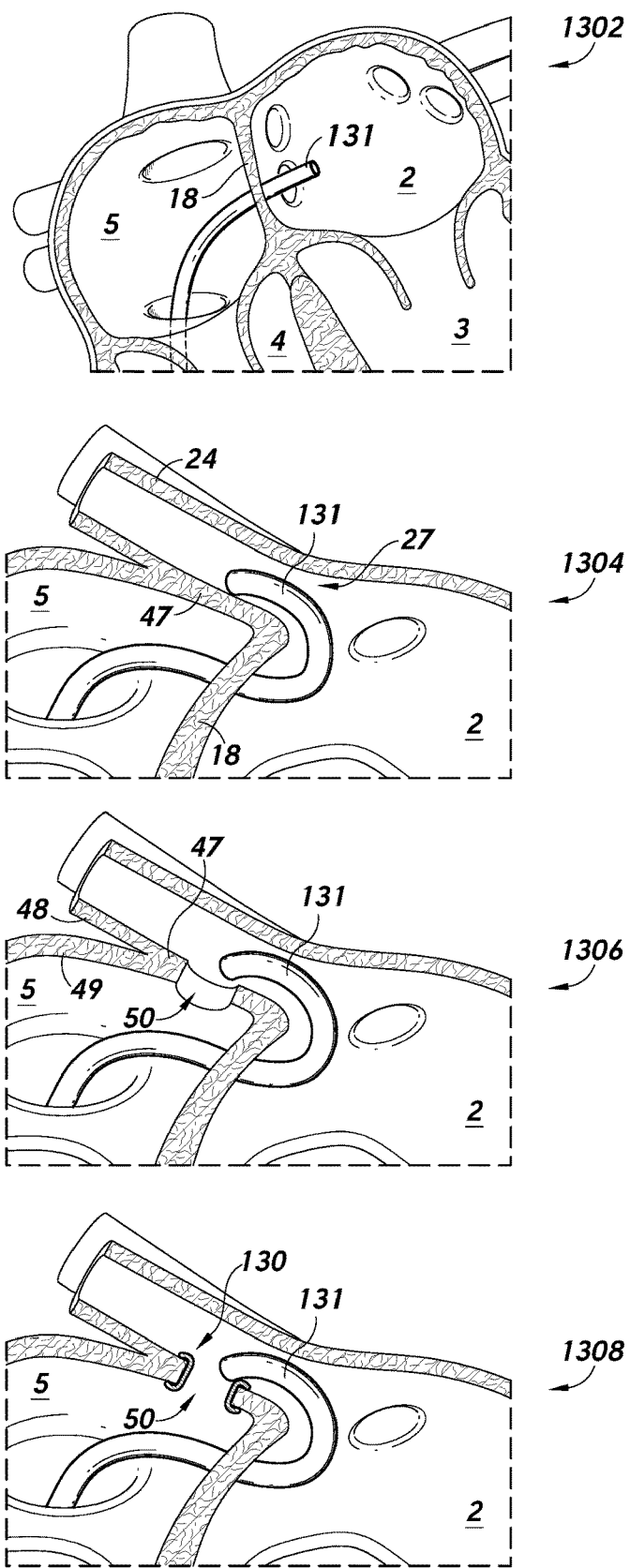
FIG. 12
FIG. 13

PULMONARY VEIN SHUNTING

RELATED APPLICATIONS

This application claims priority based on U.S. Provisional Patent Application Ser. No. 63/144,218, filed Feb. 1, 2021 and entitled PULMONARY VEIN SHUNTING, the complete disclosure of which is hereby incorporated herein by reference in its entirety.

BACKGROUND

Field

The present disclosure generally relates to the field of medical devices and procedures.

Description of Related Art

Certain physiological parameters associated with chambers of the heart, such as fluid pressure, can have an impact on patient health prospects. In particular, high cardiac fluid pressure can lead to heart failure and/or other complications in some patients. Therefore, reduction of pressure in certain chambers and vessels of the heart can improve patient health in some cases.

SUMMARY

Described herein are devices, methods, and systems that facilitate shunting of blood from the left side of the heart to the right side of the heart via one or more of the pulmonary veins. Devices associated with the various embodiments of the present disclosure can include shunt structures configured to retain blood flow pathways through pulmonary vein walls. Methods associated with the various embodiments of the present disclosure can involve forming shunt openings in pulmonary vein walls to allow blood to flow from the pulmonary vein(s) directly into various right-side chamber(s) and/or vessel(s) of the heart.

In some implementations, the present disclosure relates to a method of shunting blood. The method comprises accessing a left atrium of a heart with a surgical instrument, advancing the surgical instrument into a pulmonary vein fluidly coupled to the left atrium, forming an opening in a wall portion of the pulmonary vein, and shunting blood from the pulmonary vein into a right-side structure of the heart through the opening in the wall portion of the pulmonary vein.

The wall portion can be a common wall between the pulmonary vein and the right-side structure.

In some embodiments, the right-side structure is a superior vena cava. In some embodiments, the right-side structure is a right atrium of the heart. In some embodiments, the right-side structure is a pulmonary artery.

In some embodiments, the pulmonary vein is a right superior pulmonary vein. In some embodiments, the pulmonary vein is a right inferior pulmonary vein.

The method may further comprise deploying a shunt structure within the opening to retain the opening in the wall of the pulmonary vein. For example, the method may further comprise anchoring the shunt structure to an interior wall of the right-side structure.

In some embodiments, accessing the left atrium is achieved via a transcatheter access path and the surgical instrument comprises a catheter.

The method may further comprise forming an opening in a wall portion of the right-side structure, wherein said shunting blood is through the opening in the wall portion of the right-side structure. For example, the method further comprises securing the opening in the wall portion of the pulmonary vein to the opening in the wall portion of the right-side structure.

In some implementations, the present disclosure relates to a method of shunting blood. The method comprises accessing an interior of a left-side structure of a heart with a surgical instrument, forming an opening in a wall portion of a superior vena cava of the heart, and shunting blood from the left-side structure to the superior vena cava via the opening in the wall portion of the superior vena cava.

The left-side structure may be a pulmonary vein. For example, the pulmonary vein may be a right superior pulmonary vein.

In some embodiments, the wall portion of the superior vena cava is a common wall between the superior vena cava and the left-side structure.

The method can further comprise deploying a shunt structure within the opening to retain the opening.

In some implementations, the present disclosure relates to a method of shunting blood. The method comprises accessing a left atrium of a heart with a tissue-cutting means, advancing the tissue-cutting means into a pulmonary vein fluidly coupled to the left atrium, forming an opening in a wall portion of the pulmonary vein using the tissue cutting means, and shunting blood from the pulmonary vein into a right-side structure of the heart through the opening in the wall portion of the pulmonary vein.

In some embodiments, the tissue-cutting means comprises at least one blade. In some embodiments, the tissue-cutting means comprises a tissue ablation transducer. In some embodiments, the tissue-cutting means comprises a needle.

The method can further comprise dilating the opening using a dilator device.

The method can further comprise deploying a channel-retention means in the opening. For example, the channel-retention means can comprise a wireform stent.

For purposes of summarizing the disclosure, certain aspects, advantages and novel features have been described. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

FIG. 12 is a flow diagram illustrating a process for forming a pulmonary vein shunt in accordance with one or more embodiments.

FIG. 13 provides cross-sectional images of cardiac anatomy and certain devices corresponding to the process of FIG. 12 according to one or more embodiments.

FIGS. 14-1 and 14-2 show posterior views of hearts having pulmonary vein shunts formed in right inferior pulmonary veins in accordance with one or more embodiments.

DETAILED DESCRIPTION

Figure 1:
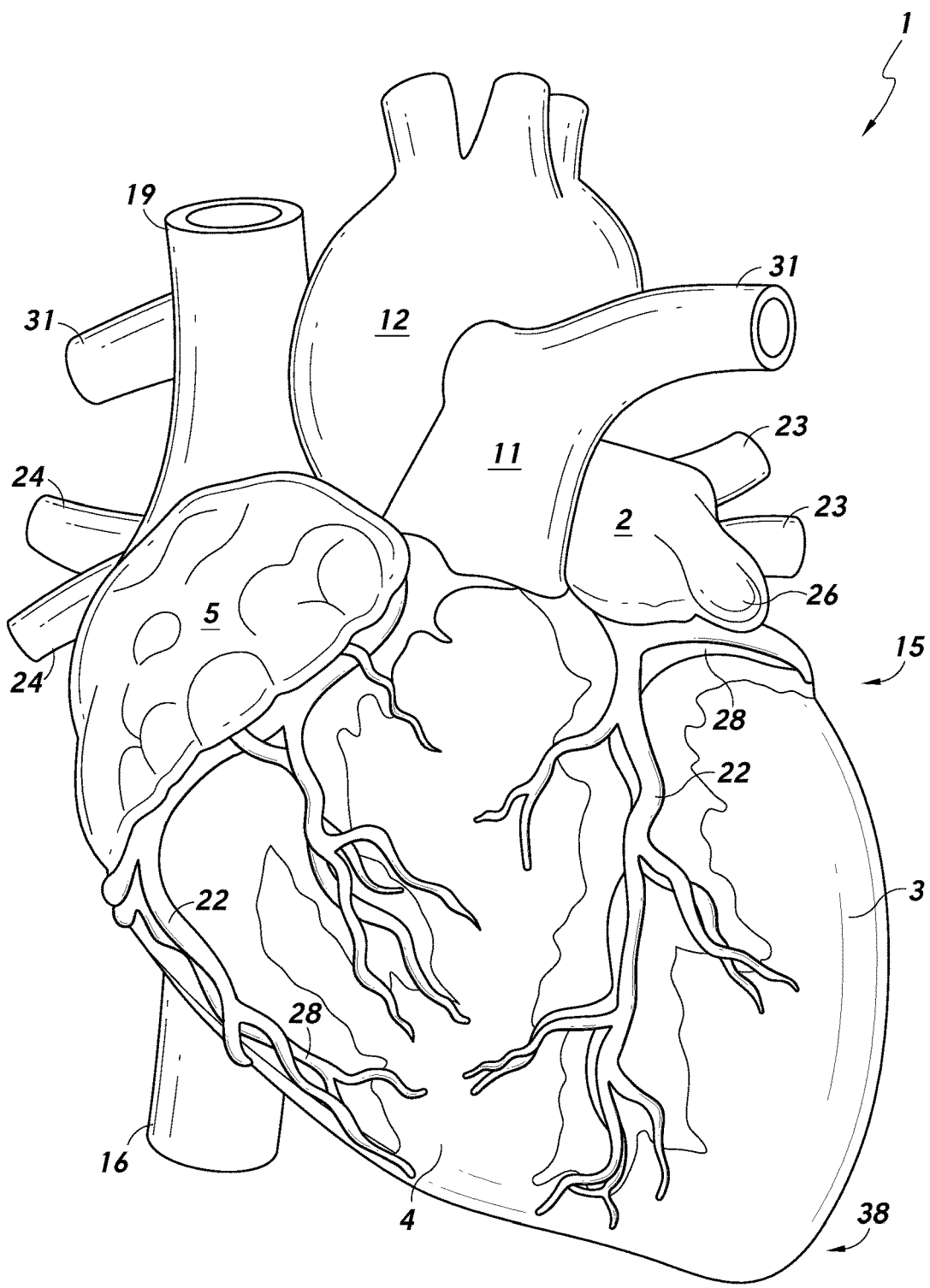
FIG. 1 is an anterior view of an example human heart.

The headings provided herein are for convenience only and do not necessarily affect the scope or meaning of the claimed invention.

Although certain preferred embodiments and examples are disclosed below, it should be understood that the inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Certain standard anatomical terms of location are used herein to refer to the anatomy of animals, and namely humans, with respect to various embodiments. Although certain spatially relative terms, such as "outer," "inner," "upper," "lower," "below," "above," "vertical," "horizontal," "top," "bottom," and similar terms, are used herein to describe a spatial relationship of one device/element or anatomical structure to another device/element or anatomical structure, it is understood that these terms are used herein for ease of description to describe the positional relationship between element(s)/structures(s), as illustrated in the drawings. It should be understood that spatially relative terms are intended to encompass different orientations of the element (s)/structures(s), in use or operation, in addition to the orientations depicted in the drawings. For example, an element/structure described as "above" another element/structure may represent a position that is below or beside such other element/structure with respect to alternate orientations of the subject patient or element/structure, and vice-versa. It should be understood that spatially relative terms, including those listed above, may be understood relative to a respective illustrated orientation of a referenced figure.

Cardiac Anatomy

Figure 2:
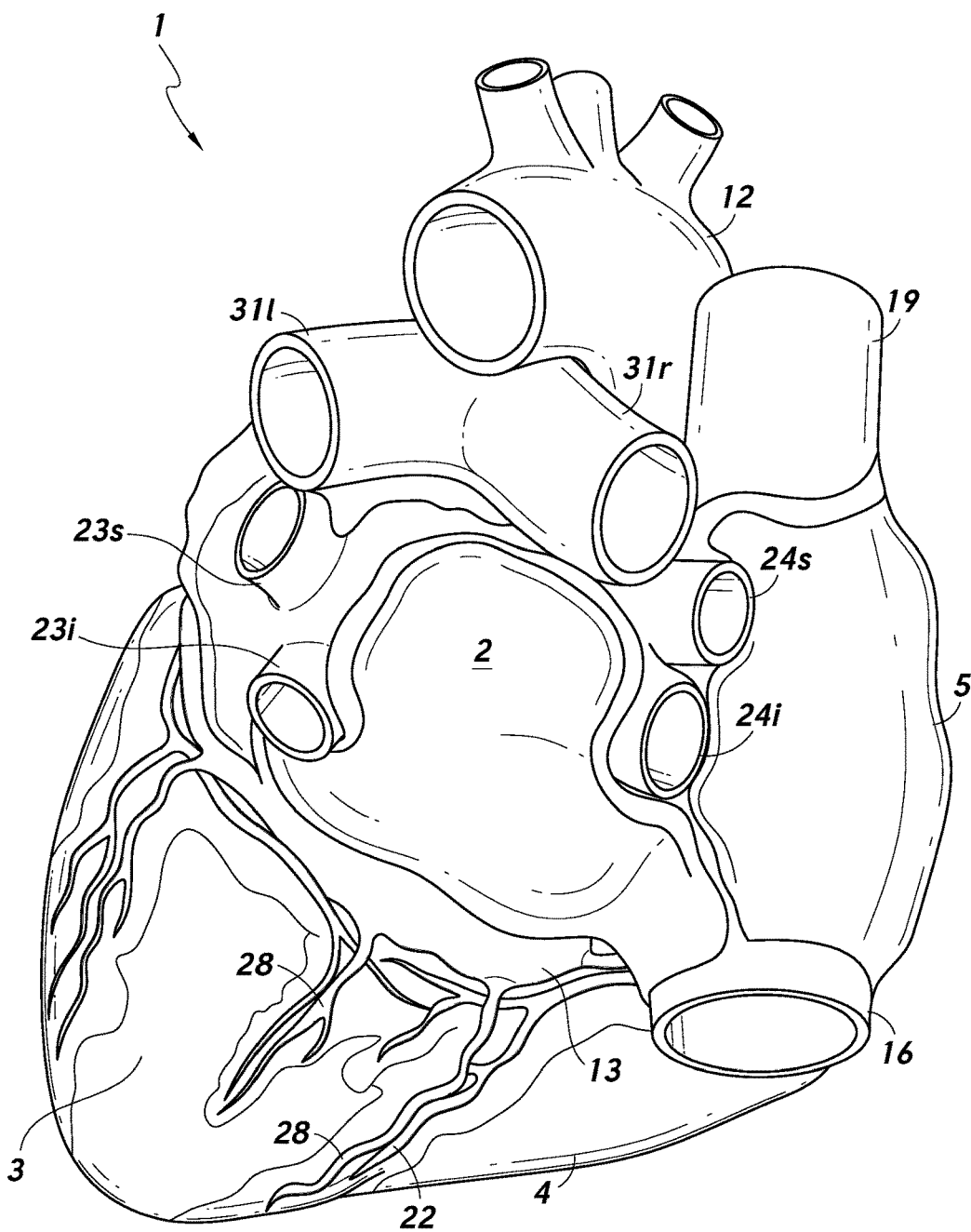
FIG. 2 is a posterior view of an example human heart.
Figure 3:
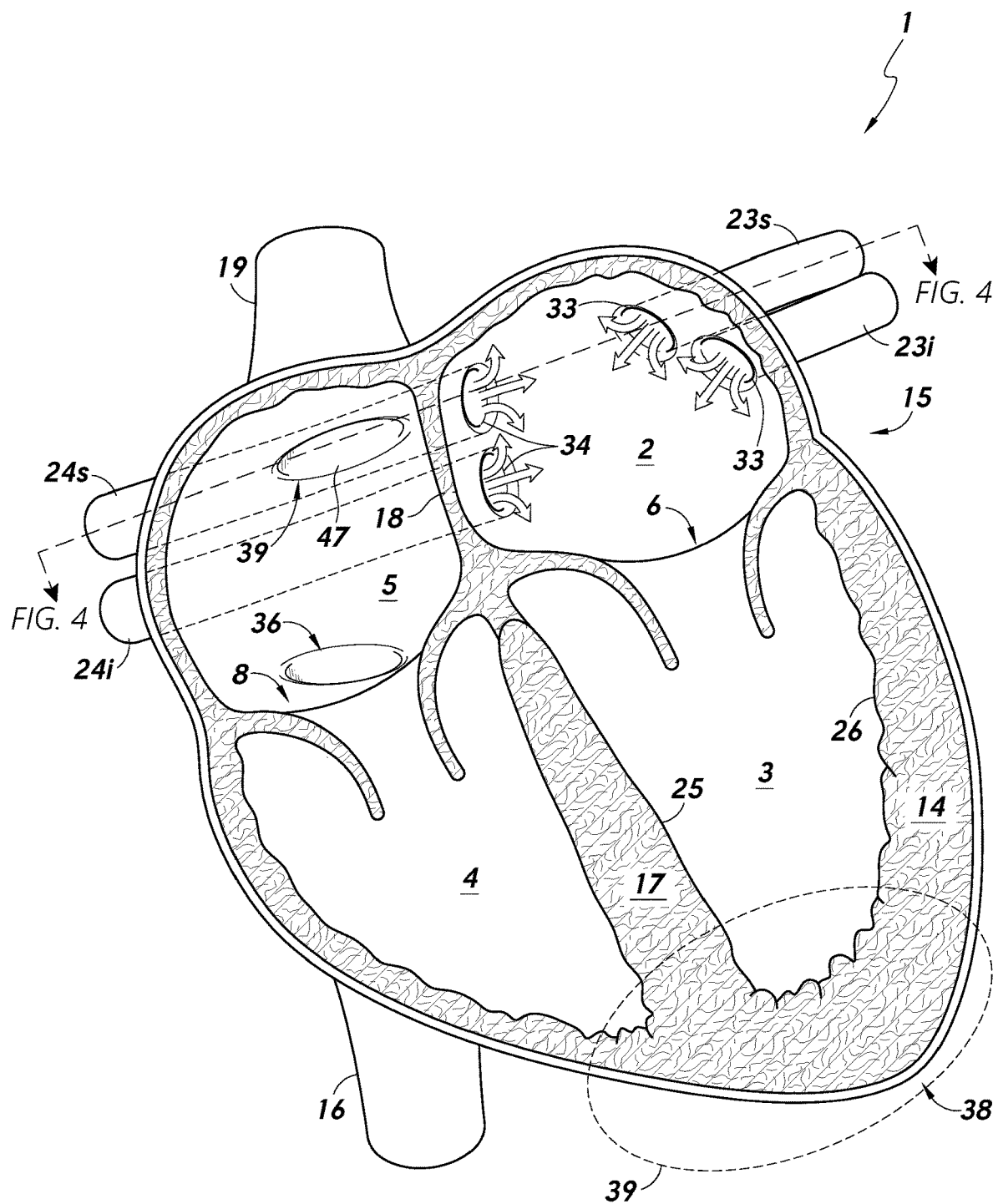
FIG. 3 is a cross-sectional view of an example human heart.
Figure 4:
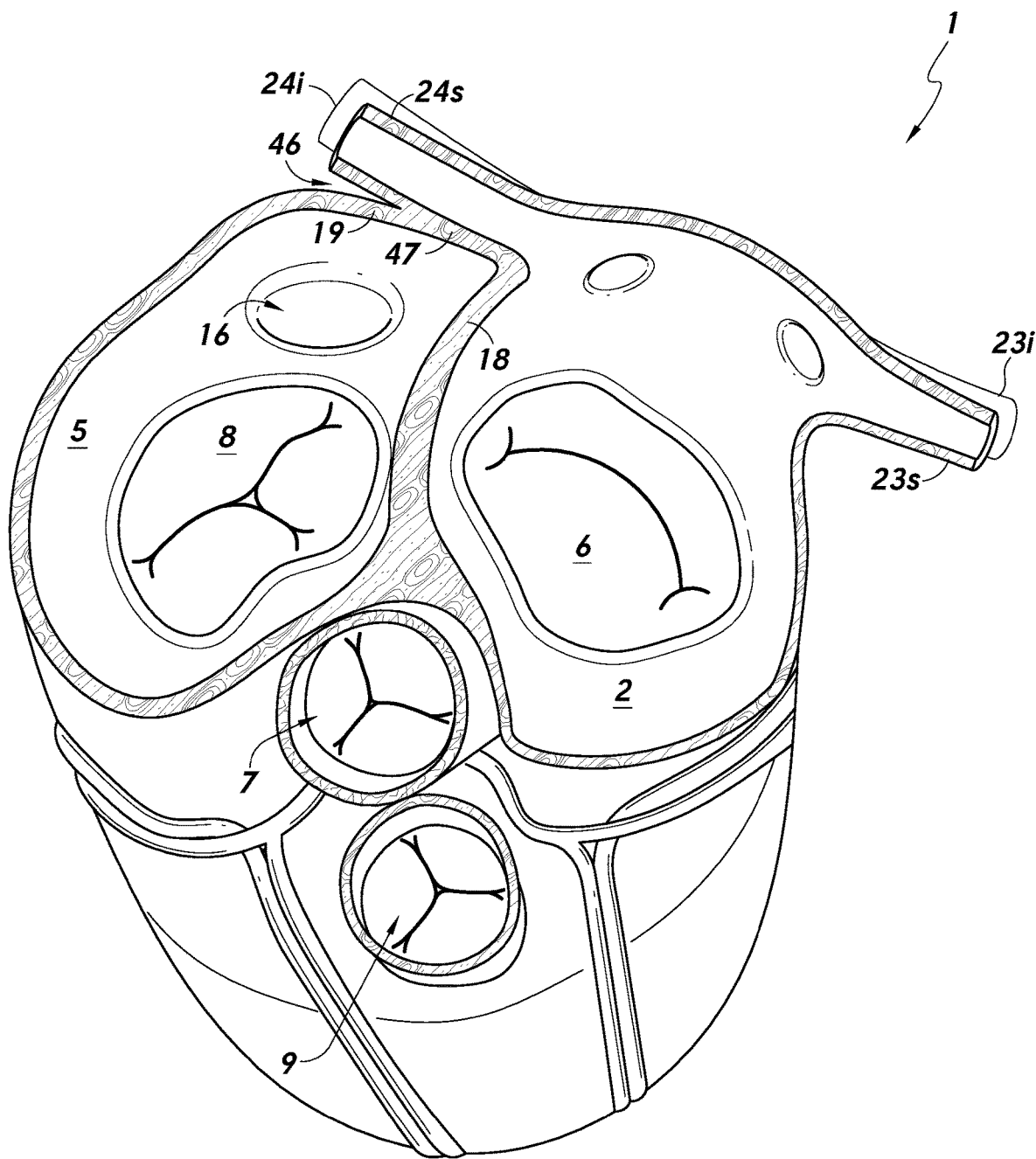
FIG. 4 is a superior cross-sectional view of the heart of FIG. 3.

The present disclosure relates to systems, devices, and methods for shunting blood from a pulmonary vein to a fight-side chamber/vessel of a heart. Therefore, aspects of the present disclosure relate to the anatomy of the heart, and so the description below includes description of cardiac anatomy for the purpose of providing context for the various inventive features presented herein. FIG. 1 is an anterior view of an example human heart 1; human anatomy is presented and discussed for convenience, although the inventive features presented herein are applicable to any mammalian cardiac anatomy. FIG. 2 is a posterior view of the heart 1, whereas FIG. 3 is a frontal cross-sectional view of the heart 1 and FIG. 4 is a superior cross-sectional view of the heart 1.

With reference to FIGS. 1-4, the heart 1 includes four chambers, namely the left ventricle 3, the left atrium 2, the right ventricle 4, and the right atrium 5. A wall of muscle, referred to as the septum, separates the left-side chambers from the tight-side chambers. In particular, an atrial septum wall portion 18 (referred to herein as the "atrial septum," "interatrial septum," or "septum") separates the left atrium 2 from the right atrium 5, whereas a ventricular septum wall portion 17 (referred to herein as the "ventricular septum," "interventricular septum," or "septum") separates the left ventricle 3 from the right ventricle 4. The inferior tip 38 of the heart 1 is referred to as the apex and is generally located on or near the midclavicular line, in the fifth intercostal space.

The heart 1 further includes four valves for aiding the circulation of blood therein. Heart valves may generally comprise a relatively dense fibrous ring, referred to herein as the annulus, as well as a plurality of leaflets or cusps attached to the annulus. Generally, the size and position of the leaflets or cusps may be such that when the heart contracts, the resulting increased blood pressure produced within the corresponding heart chamber forces the leaflets at least partially open to allow flow from the heart chamber. As the pressure in the heart chamber subsides, the pressure in the subsequent chamber or blood vessel may become dominant and press back against the leaflets. As a result, the leaflets/cusps come in apposition to each other, thereby closing the flow passage.

The valves of the heart 1 include the tricuspid valve 8, which separates the right atrium 5 from the right ventricle 4. The tricuspid valve 8 may generally have three cusps or leaflets and may generally close during ventricular contraction (i.e., systole) and open during ventricular expansion (i.e., diastole). The valves of the heart 1 further include the pulmonary valve 9, which separates the right ventricle 4 from the pulmonary artery 11 and may be configured to open during systole so that blood may be pumped toward the lungs, and close during diastole to prevent blood from leaking back into the heart from the pulmonary artery 11. The pulmonary valve 9 generally has three cusps/leaflets, wherein each one may have a crescent-type shape. The heart 1 further includes the mitral valve 6, which generally has two cusps/leaflets and separates the left atrium 2 from the left ventricle 3. The mitral valve 6 may generally be configured to open during diastole so that blood in the left atrium 2 can flow into the left ventricle 3, and advantageously closes during diastole to prevent blood from leaking back into the left atrium 2. Lastly, the aortic valve (not shown in FIGS. 1 and 2; see FIG. 9) separates the left ventricle 3 from the aorta 12. The aortic valve 7 is configured to open during systole to allow blood leaving the left ventricle 3 to enter the aorta 12, and close during diastole to prevent blood from leaking back into the left ventricle 3.

The atrioventricular (i.e., mitral and tricuspid) heart valves are generally associated with a sub-valvular apparatus (not shown), including a collection of chordae tendineae and papillary muscles securing the leaflets of the respective valves to promote and/or facilitate proper coaptation of the valve leaflets and prevent prolapse thereof. The papillary muscles, for example, may generally comprise finger-like projections from the ventricle walls. The chordae tendineae generally keep the valve leaflets from opening in the wrong direction, thereby preventing blood to flow back to the left atrium 2.

Surrounding the ventricles (3, 4) are a number of arteries 22 that supply oxygenated blood to the heart muscle and a number of veins 28 that return the blood from the heart muscle to the right atrium 5 via the coronary sinus 13, which is a relatively large vein that extends generally around the upper portion of the left ventricle 3 and provides a return conduit for blood returning to the right atrium 5. The pulmonary artery 11 carries deoxygenated blood from the right side of the heart to the lungs. The pulmonary artery includes a pulmonary trunk 11 and left $31_l$ and right $31_r$ pulmonary arteries that branch off of the pulmonary trunk 11, as shown.

The primary roles of the chambers of the left side of the heart (i.e., left atrium 2 and left ventricle 3) are to act as holding chambers for blood returning from the lungs (not shown) and to act as a pump to transport blood to other areas of the heart. The left atrium 2 receives oxygenated blood from the lungs via the pulmonary veins 23, 24. The oxygenated blood that is collected from the pulmonary veins 23, 24 in the left atrium 2 enters the left ventricle 3 through the mitral valve 6. In some patients, the walls of the left atrium 2 are slightly thicker than the walls of the right atrium 5. Deoxygenated blood enters the right atrium 5 through the inferior 16 and superior 19 venae cavae. The right side (i.e., right atrium 5 and right ventricle 4) of the heart then pumps this deoxygenated blood into the pulmonary arteries 31 around the lungs. There, fresh oxygen enters the blood stream, and the blood moves to the left side of the heart via the network of pulmonary veins 23, 24 that ultimately terminate at the left atrium 2, as shown.

The ostia 33, 34 of the pulmonary veins are generally located at or near the posterior left atrial wall of the left atrium 2. The right pulmonary veins 24 carry blood from the right lung (not shown) to the left atrium 2, where it is distributed to the rest of the circulatory system as described in detail herein. The right pulmonary veins 24 include the right inferior pulmonary vein $24_i$ and the right superior pulmonary vein $24_s$, as shown. Meanwhile, the left pulmonary veins 23 generally include the left inferior pulmonary vein 23, and the left superior pulmonary vein $23_s$. The left pulmonary veins 23 generally carry blood from the left lung (now shown) into the left atrium 2, where it continues to flow to the rest the body.

The left ventricle 3 is the primary pumping chamber of the heart 1. A healthy left ventricle is generally conical or apical in shape in that it is longer (with respect the mean electrical axis of the heart) than it is wide (with respect to a transverse axis extending between opposing walls of the left ventricle at their widest point) and descends from a base 15 with a decreasing cross-sectional diameter and/or circumference to the point or apex 14. Generally, the apical region of the heart can be considered the bottom region of the heart that is within the left and/or right ventricular region but is distal to the mitral 6 and tricuspid 8 valves and disposed toward the tip 38 of the heart.

The pumping of blood from the left ventricle 3 is accomplished by a squeezing motion and a twisting or torsional motion. The squeezing motion occurs between the lateral walls of the left ventricle 3 and the septum 17. The twisting motion is a result of contraction of heart muscle fibers that extend in a generally circular or spiral direction around the heart. When these fibers contract, they produce a gradient of angular displacements of the myocardium from the apex 14 to the base 15 about the mean electrical axis of the heart. The resultant force vectors extend at angles from about 30-60 degrees to the flow of blood through the aortic valve and ascending aorta 12. The contraction of the heart 1 is manifested as a counterclockwise rotation of the apex 14 relative to the base 15, when viewed from the apex 14 (i.e., inferior view of the heart 1). The contractions of the heart 1, in connection with the filling volumes of the left atrium 2 and ventricle 3, respectively, can result in relatively high fluid pressures in the left side of the heart at least during certain phase(s) of the cardiac cycle, the results of which are discussed in detail below. Attached to the left atrium 2 is the left atrial appendage 26, which generally may comprise a muscular ear-shaped pouch. The left atrial appendage 26 (also referred to as the left auricle) is thought to function as a decompression chamber during left ventricular systole and during other periods when left atrial pressure is high.

Elevated Left-Side Cardiac Pressures

Fluid volume and pressure conditions associated with the various cardiac chambers and anatomy described above can impact the health of a patient. For example, congestive heart failure is a condition associated with the relatively slow movement of blood through the heart and/or body, which can cause the fluid pressure in one or more chambers of the heart to increase, particularly in the left side of the heart. For example, when the left ventricle fails or when the mitral valve fails, left atrial pressure can increase substantially. As a result, the heart may not pump sufficient oxygen to meet the body's needs. Increased left atrial volume and pressure can further result in abnormal P waves in cardiac electrical signals.

The various chambers of the heart may respond to pressure increases by stretching to hold more blood to pump through the body or by becoming relatively stiff and/or thickened. The walls of the heart can eventually weaken and become unable to pump as efficiently. In some cases, the kidneys may respond to cardiac inefficiency by causing the body to retain fluid. Fluid build-up in arms, legs, ankles, feet, lungs, and/or other organs can cause the body to become congested, which is referred to as congestive heart failure. Generally, left atrial pressure may be relatively highly correlated with risk of congestive heart failure. Furthermore, there may generally be a relatively strong correlation between increases in left atrial pressure and pulmonary congestion. Acute decompensated congestive heart failure is a leading cause of morbidity and mortality, and therefore treatment and/or prevention of congestive heart failure is a significant concern in medical care. Embodiments of the present disclosure can serve to treat and/or prevent congestive heart failure through reduction in left atrial pressure in patients suffering from high left atrial pressure. Generally, increases in ventricular filling pressures associated with diastolic and/or systolic heart failure can occur prior to the occurrence of symptoms that lead to hospitalization. For example, cardiac pressure indicators may present weeks prior to hospitalization in some patients. Therefore, reduction in left atrial and/or ventricular pressure in accordance with embodiments of the present disclosure may advantageously be implemented as a preventative measure to reduce risks of hospitalization and/or the onset of heart failure.

Determination of high left atrial pressure may be made in any suitable or desirable way. Dyspnea represents a cardiac pressure indicator characterized by shortness of breath or the feeling that one cannot breathe well enough. Dyspnea may result from elevated atrial pressure, which may cause fluid buildup in the lungs from pressure back-up. Therefore, it may be desirable to implement certain left atrial pressure reduction solutions presented herein in response to dyspnea symptoms. Additionally or alternatively, left atrial pressure reduction in accordance with embodiments or the present disclosure may be implemented prior to manifestation of dyspnea symptoms and/or other symptoms/complications through direct and/or indirect pressure (e.g., left atrial pressure) monitoring and/or intervention. For example, left atrial pressure monitoring may be implemented using one or more sensors implanted or disposed in one or more chambers of the heart, such as within the left atrium. In some implementations, left atrial pressure may be derived or inferred through measurement of other chambers or vessels of the heart, which may serve as surrogates of left atrial pressure. For example, measurements of pressure in one or more of the right atrium, tight ventricle, pulmonary artery, and/or pulmonary artery wedge may indicate elevated left atrial pressure.

Pulmonary Vein Shunting

In some implementations, the present disclosure relates to systems, devices, and methods for reducing fluid volume and/or pressure in the left side of the heart, such as in the left atrium, left ventricle, and/or pulmonary veins, through the shunting of blood through wall(s) of one or more of the pulmonary veins. For example, shunting in accordance with aspects of the present disclosure can involve forming a shunt flow path opening between a pulmonary vein, such as the right superior pulmonary vein, and the superior vena cava and/or right atrium.

Figure 5A:
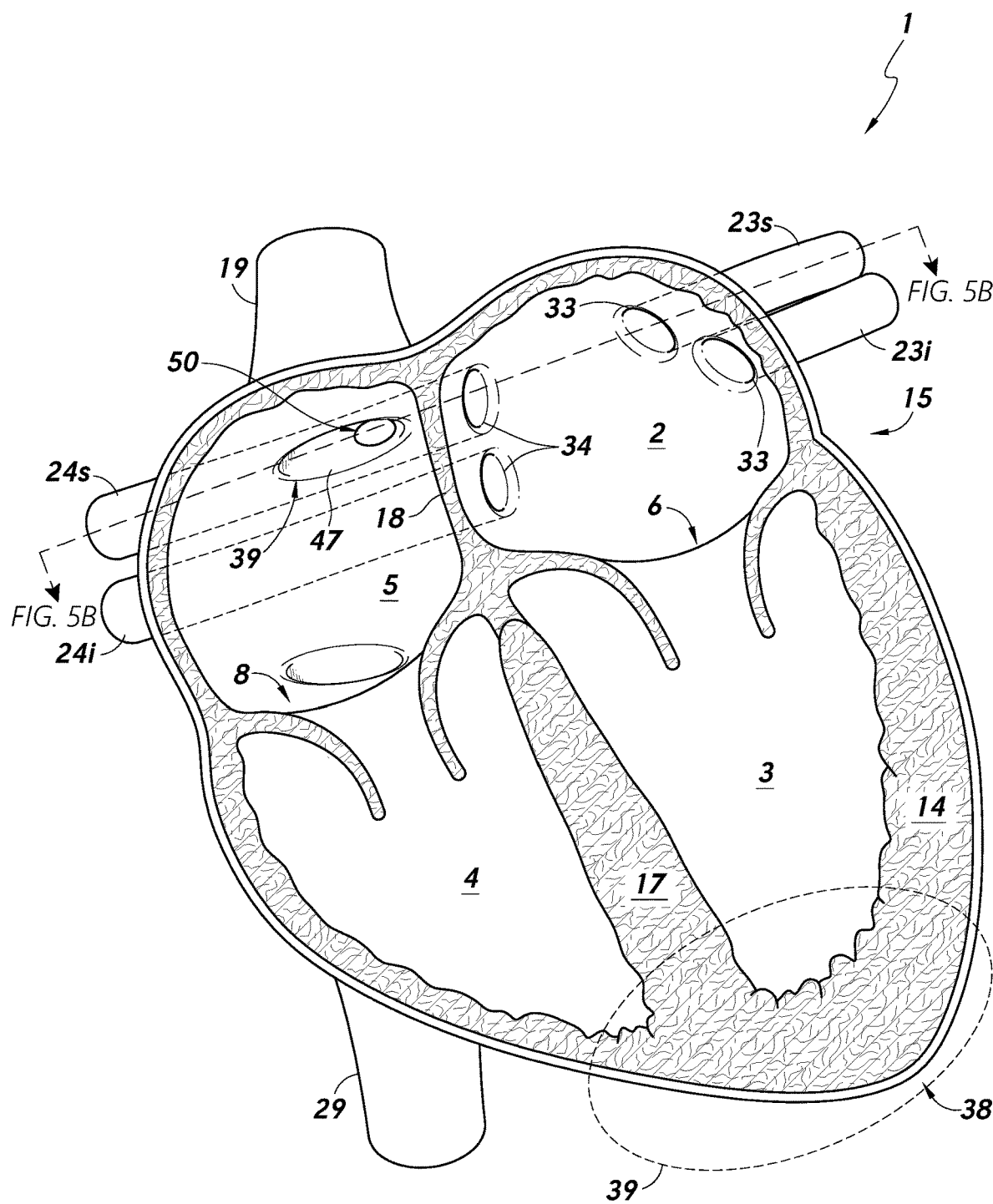
FIG. 5A is a cross-sectional view of a heart having a pulmonary vein shunt opening in accordance with one or more embodiments.
Figure 5B:
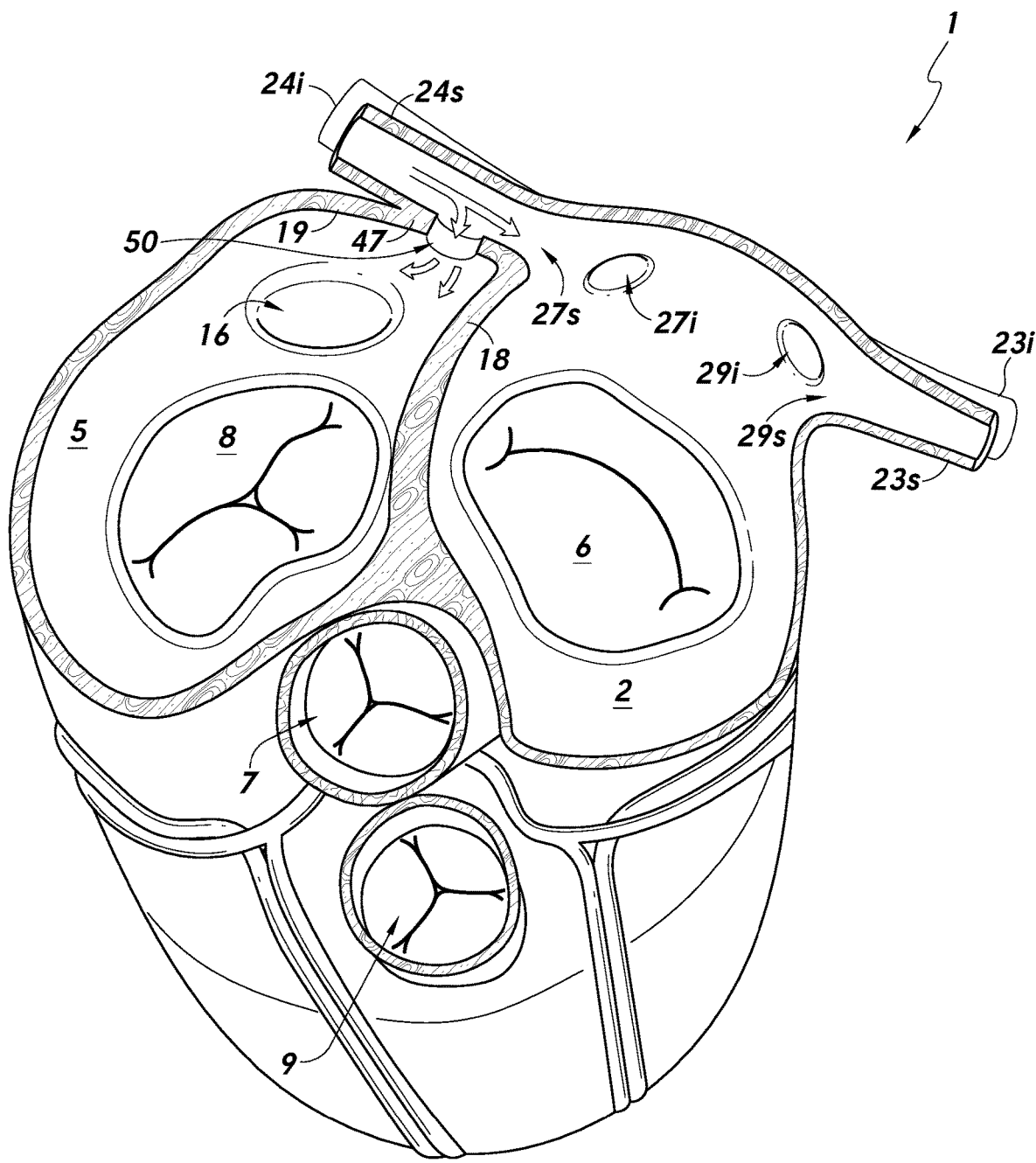
FIG. 5B is a superior cross-sectional view of the heart of FIG. 5A having a pulmonary vein shunt opening in accordance with one or more embodiments.

FIGS. 5A and 5B show frontal and superior cross-sectional views, respectively, of a heart 1 having a pulmonary vein shunt opening 50 in accordance with one or more embodiments of the present disclosure. In some patients, the anatomy of the right superior pulmonary vein $24_s$ is positioned and oriented such that a common wall 47 between the pulmonary vein $24_s$ and the superior vena cava 19 may be present, such as at or near an area of the superior vena cava that opens into the right atrium 5. Therefore, an opening 50 formed in the common wall 47 may allow for the shunting of blood from the pulmonary vein 24 into the right atrium 5 without leakage of blood outside of the heart.

The common wall portion 47 may be present near the septal boundary, between the right atrium 5 and the left atrium 2. For example, the ostium $27_s$ of the right superior pulmonary vein $24_s$ may likewise be positioned in an area that is relatively close to the interatrial septum 18, wherein an area near the opening/ostium $27_s$ within the pulmonary vein $24_s$ on a generally anterior side of the pulmonary vein $24_s$ may be shared with the wall of the superior vena cava 19 and/or right atrium 5.

Although certain embodiments are described herein as including or involving a shunt opening formed in a wall separating the right superior pulmonary vein $24_s$ from the right atrium 5, in some patients, a suitable shared wall area between the pulmonary vein $24_s$ and the right side of the heart may be below the superior vena cava ostium 39, such that shunt opening 50 opens directly into the right atrium 5 rather than into the superior vena cava 19. Therefore, description herein of pulmonary vein shunts, such as shunt openings and shunt implant devices, between a pulmonary vein and the superior vena cava should be understood to also relate to and disclose shunts between the pulmonary vein and the right atrium below the ostium of the superior vena cava.

In some embodiments, the shunt opening 50 is formed by forming an opening 50 in the wall 47, wherein the shunt opening 50 may be a temporary shunt that may be permitted to close-/heal-over over time. That is, the opening 50 may be formed without implantation of a shunt/opening reinforcement structure or device. The shunt opening 50 may be formed using a transcatheter delivery system including one or more tools configured to form an opening in the tissue wall 47. For example, the opening 50 may be formed using an ablation tool, such as ultrasonic and/or radio-frequency radiation ablation tool or similar. Such ablation tool may be configured to burn the tissue of the wall 47 to cause the opening 50 to be formed therein through the application of ultrasonic energy and/or radiofrequency radiation, or the like, emitted using an energy transducer component. For example, cardiac tissue ablation may be implemented by delivering energy, such as ultrasound or radiofrequency electromagnetic radiation energy, through a catheter or other transducer device to the target area of the pulmonary vein wall. Such energy can ablate or destroy relatively small focal areas of the cardiac tissue and form an opening therein. Ablation may further be implemented to cauterize the tissue around an opening formed in the pulmonary vein wall using other means (e.g., needle/wire, cutting blade, and/or dilator). In addition to ultrasound and radiofrequency radiation ablation, other types of catheter ablation can be implemented. For example, cardiac tissue ablation may be implemented using cryoablation, which generally utilizes a pressurized refrigerant in a catheter tip or other device to ablate the target tissue. According to some solutions, ablation can be implemented using minimally invasive techniques, such as through transcatheter access to the target atrium and/or other area of the heart. Transcatheter shunt formation and/or implantation in connection with embodiments of the present disclosure may be particularly desirable with respect to patients suffering from elevated left-side cardiac pressures, which may generally be considered a high-risk patient demographic may be at risk of injury and/or other complications from surgical interventions.

Additional solutions can be implemented for producing the opening 50 in the wall 47. Such means/mechanism(s) may advantageously be implemented using transcatheter procedures. Example means/tools that may be implemented to form pulmonary vein shunt openings in tissue walls in accordance with aspects of the present disclosure may include one or more blades, needles, wires, and/or other devices having a relatively sharp point or edge and configured to be penetrated/cut through a cardiac tissue wall. In some implementations, a cutting tool configured to excise a cut-out portion of the tissue wall and remove the cut-out portion of tissue using the delivery system may be used to form the pulmonary vein shunt opening.

The implementation of a shunt from within a pulmonary vein may provide certain advantages or benefits relative to certain other shunt positions/locations. For example, the position within the pulmonary vein may provide a position relatively far away from the mitral valve 6, such that any structure or implant that may be utilized in connection with the shunting may be relatively far from the mitral valve and less inclined to obstruct flow within the left atrium. Furthermore, the size of the pulmonary vein 24 may be of sufficient diameter to allow for catheter access for the purpose of forming the shunt opening 50 and/or deploying an implant device therein. Furthermore, by shunting blood directly into the superior vena cava and or right atrium, such blood flow may not result in any undesirable altering of fluid dynamics in any chamber or blood vessel of the right side of the heart. For example, where blood is shunted into a blood vessel that is smaller than the superior vena cava and right atrium, such shunted blood flow may result in undesirable pressurization and/or the forcing of blood upstream, possibly resulting in undesirable pooling, dilation, and/or other adverse physiological effects. With particular respect to shunting into the superior vena cava, where the patient is in a generally upright orientation, gravity may serve to direct the shunted fluid down into the right atrium, resulting in relatively insignificant impact on the fluid dynamics of the right side of the heart.

Figure 6:
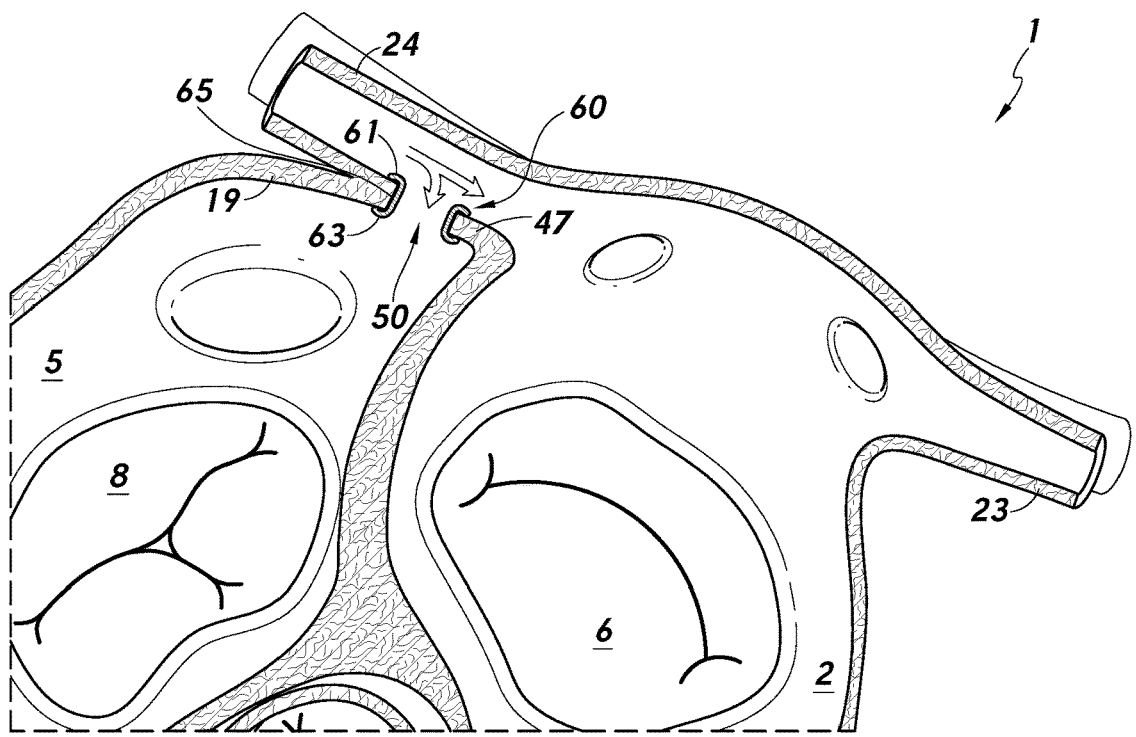
FIG. 6 is a superior cross-sectional view of a heart having a pulmonary vein shunt implant device implanted therein in accordance with one or more embodiments.

FIG. 6 is a superior cross-sectional view of a heart 1 having a pulmonary vein shunt implant device 60 implanted therein in accordance with one or more embodiments of the present disclosure. As described in detail above, embodiments of the present disclosure relate to the formation of shunt pathways from within pulmonary veins to provide shunting from the left side of the heart the right side of the heart. In some implementations, embodiments of the present disclosure further involve the implantation of certain shunt structures configured to retain a shunt opening through a pulmonary vein wall postoperatively. For example, FIG. 6 shows a tubular or other-shaped conduit structure 60 used as a shunt implant device deployed within a shunt opening 50 to provide retention support therefore. It should be understood that any of the embodiments disclosed herein may be implemented using a shunt implant structure to hold open the shunt opening and/or define a desired shunt flow path. Furthermore, it should be understood that shunt implant devices in accordance with aspects of the present disclosure may have any suitable or desirable form or shape. The shunt implant device 60 may be implanted to provide a shunt from a superior or inferior right pulmonary vein 24, or from either of the left-side pulmonary veins 23.

The shunt implant device 60 may be implanted in the opening 50 in the common wall 47 between the pulmonary vein 24 and the superior vena cava 19 and/or right atrium 5. In some embodiments, the shunt implant device 60 includes a conduit portion 65 that defines the shunt flow pathway. The conduit portion 65 may have any suitable or desirable cross-sectional shape or area, such as circular, oblong, ovoid, elliptical, rectangular, or other shape. In some embodiments, the shunt implant device 60 is anchored to one or more of the pulmonary vein 24 and the superior vena cava 19 or right atrium 5. For example, the shut implant device 60 may include one or more proximal pulmonary vein anchors 61 configured to secure the conduit device 60 to the interior wall of the pulmonary vein 24. Additionally or alternatively, the shunt implant device 60 may include one or more distal anchors 63, which may be configured to secure the conduit device to the interior wall of the superior vena cava 19 and/or right atrium 5. In some embodiments, the conduit portion 65 of the shunt implant device 60 is at least partially rigid, such that the form thereof may be substantially maintained over time after implantation.

Figure 7:
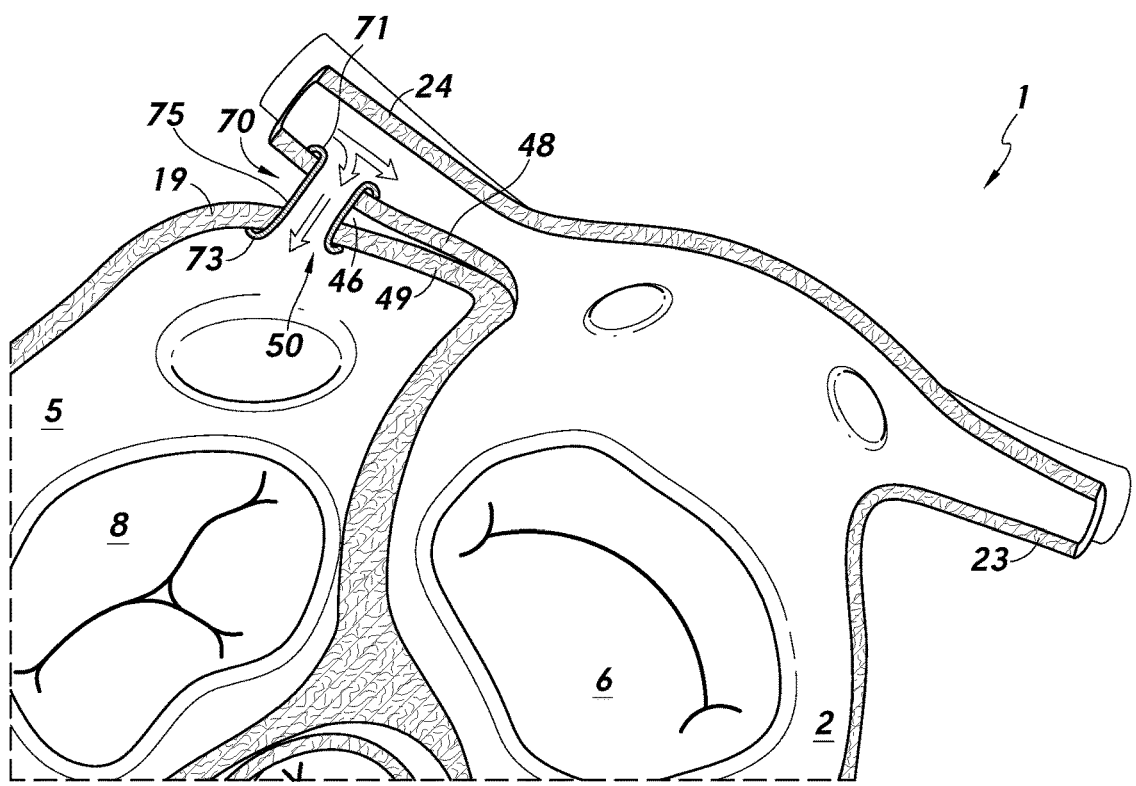
FIG. 7 is a superior cross-sectional view of a heart having a pulmonary vein shunt implant device implanted therein in accordance with one or more embodiments.

FIG. 7 is a superior cross-sectional view of a heart 1 having a pulmonary vein shunt implant device 70 implanted therein in accordance with one or more embodiments. Certain embodiments are disclosed herein relating to shunt openings and implants disposed/formed in a common wall between a pulmonary vein and a right-side blood vessel or chamber (e.g., superior vena cava, right atrium). However, in some patients, sufficient area of common wall between such vessel/chambers may not be present and/or it may be desirable to form a pulmonary vein shunt in an area that is not a common wall between the pulmonary vein and the target right-side vessel/chamber. Therefore, in some embodiments, a shunt implant device 70 may be implanted in a manner as to bridge between a pulmonary vein 24 and a right-side vessel/chamber, wherein the walls associated with such vessel/chambers in the area of the shunt implant device are not common, but rather separate walls that contact one another and/or are separated by a gap 46 in one or more areas. For example, as shown in FIG. 7, the right-side pulmonary vein 24 (e.g., right superior pulmonary vein) may have a wall 48 on a side of the pulmonary vein oriented towards the target right-side vessel/chamber, wherein an opposing wall 49 of the right-side vessel/chamber (e.g., superior vena cava 19 and/or right atrium 5) is separate from the pulmonary vein wall 48 in the area of the shunt opening 50. In at least some areas, a gap 46 may be present between the opposing walls.

When a pulmonary vein shunt is formed in an area where there is no common wall between the pulmonary vein and the target right-side vessel/chamber, it may be necessary or desirable for a conduit structure 70 to be implanted in order to prevent blood leakage outside of the heart into the chest cavity through the shunt opening. For example, the shunt implant device 70 may advantageously be fluid-tight at least in the conduit portion 75 thereof to ensure that blood shunted from the pulmonary vein 24 passes into the target right-side vessel/chamber. In some embodiments, the proximal 71 and/or distal 73 anchor features of the shunt implant device 70 may include certain flange features designed to prevent leakage of blood around the anchors. For example, such/ features may be secured to the respective interior cardiac walls in a manner as to prevent blood from leaking under the anchors/flanges and out around the outside of the conduit portion 75. Exemplary features of shunt implant devices as shown in FIGS. 6 and 7 are described in greater detail below with respect to FIG. 9.

Figure 8:
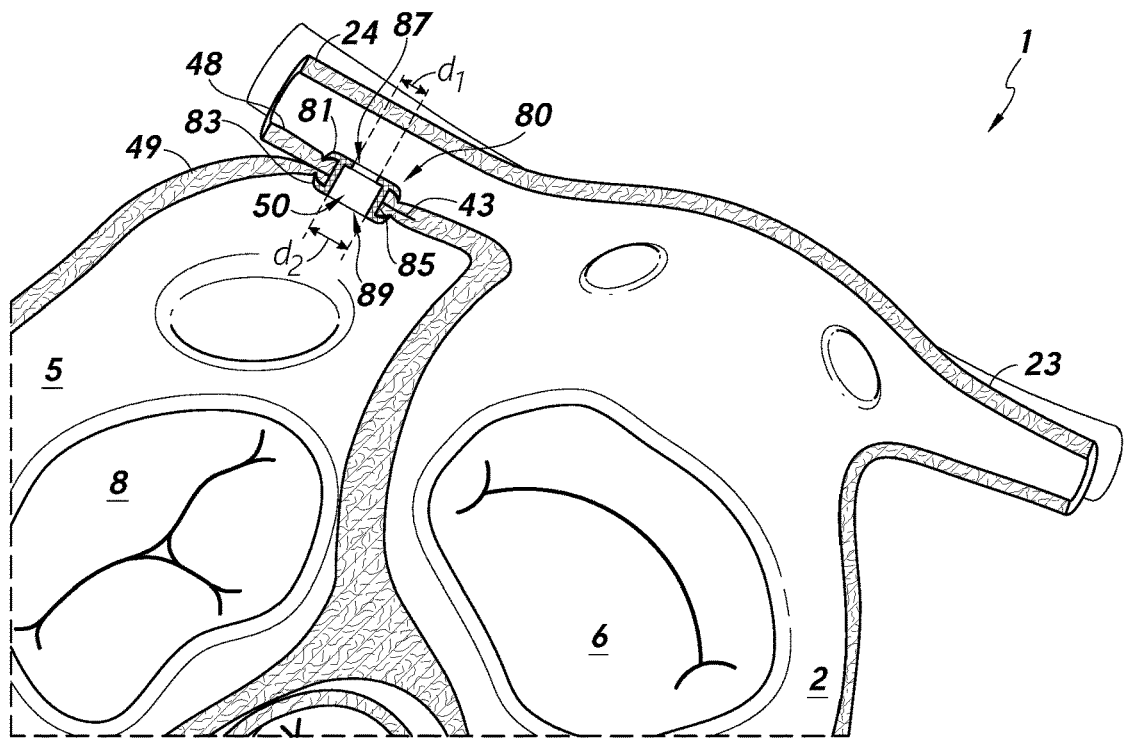
FIG. 8 is a superior cross-sectional view of a heart having a grommet-type pulmonary vein shunt implant device implanted therein in accordance with one or more embodiments.

FIG. 8 is a superior cross-sectional view of a heart 1 having a grommet-type pulmonary vein shunt implant device 80 implanted therein in accordance with one or more embodiments of the present disclosure. As described above, in areas where a pulmonary vein shunt path is desired, such area may not be entirely aligned with a common wall area between the pulmonary vein and the target right-side vessel/chamber. Therefore, as described above in connection with FIG. 7, it may be desirable to implant a shunt implant device that spans any gap/distance between the source pulmonary vein and the target right-side vessel/chamber. In some cases, it may be desirable to implant a shunt implant device that allows for the source pulmonary vein and the target right-side vessel/chamber to be clamped together to shorten the distance between such vessels/chambers and/or to provide a secure/safe shunt pathway, as shown in FIG. 8. Such shunt implant devices (e.g., grommet-type shunt structure 80) can be at least partially rigid and include distal and proximal anchors 81, 83 configured to secure the conduit portion 85 in place and/or clamp the blood vessel walls together.

As described, the grommet-style shunt implant device 80 may serve to clamp separate vessel/chamber walls together in order to provide a fluid-tight seal between the blood vessels/chambers and/or to secure the implant device 80 in place when shunting through separate vessel/chamber. Furthermore, grommet-style shunt implant devices as shown in FIG. 8 may be utilized in shunting through common walls between a pulmonary vein and right-side chamber/vessel. For example, the anchor flanges 81, 83 may serve to prevent or reduce tearing or abrasion of the tissue wall(s) around a formed shunt opening. That is, regardless of whether a shunt pathway/conduit spans a single common wall or two separate walls, the structure of the conduit portion 85 and the anchor flanges 81, 83 may maintain the integrity of the tissue wall around the opening 50 to prevent undesired tearing or other damage that may result in hemorrhage or other injury to the patient.

In some embodiments, a grommet-style shunt implant device as shown in FIG. 8 may include a proximal/inlet opening 87 and a distal/outlet opening 88, wherein the diameters and/or flow areas associated therewith may be different with respect to the proximal/inlet opening 87 and the distal/outlet opening 88. For example, in some embodiments, the proximal opening 87 may have a diameter $d_1$ that is designed to control/produce a desired amount of shunt flow, wherein the dimension $d_1$ of the proximal/inlet opening 87 is different (e.g., smaller/narrower) than the distal/outlet opening 88. In some embodiments, by utilizing a narrower inlet opening 87 compared to the outlet opening 88, back-flow from the right side of the heart into the pulmonary vein 24 may be inhibited due to the relatively higher pressure at the inlet opening 87 compared to the outlet opening 88. Further details relating to grommet-style shunt implant devices are described below in connection with FIG. 10.

Figure 9:
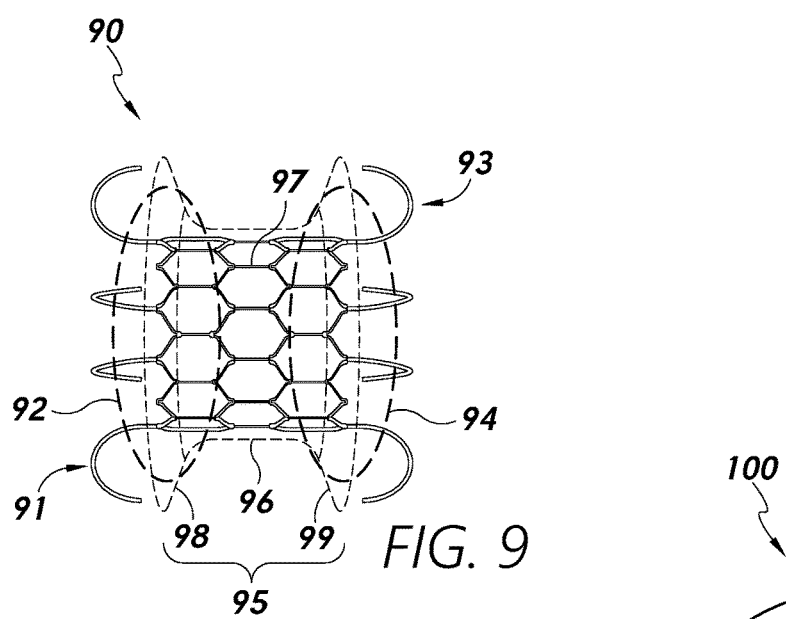
FIG. 9 illustrates an embodiment of a stent-type shunt implant device in accordance with one or more embodiments.

FIG. 9 illustrates an embodiment of a stent-type shunt implant device 90 in accordance with one or more embodiments of the present disclosure. The shunt implant device 90 may be an expandable or non-expandable implant device, and represents an example shunt implant device that may be utilized in connection with any of the disclosed embodiments. In some embodiments, the shunt implant device 90 comprises a self-expanding stent or frame component 97, which may be shaped and configured to form a conduit, such as a cylindrical-cross-sectional conduit, or conduit having any other suitable or desirable cross-sectional shape. Although certain self-expanding frames and conduits are described herein as examples in some contexts, in some embodiments, a shunt implant device may be balloon-expandable or may not require expansion after deployment (e.g., from a delivery system). In some embodiments, the shunt implant device 90 is not collapsible and/or expandable. For example, the implant device 90 may be implanted in a substantially deployed/expanded configuration in connection with a surgical or transcatheter (e.g., transfemoral) procedure or access to the heart of a patient.

Opposite ends 92, 94 of the conduit portion 95 of the device 90 (e.g., as formed by the frame 97) can be coupled to and/or otherwise associated with one or more anchor components 91, 93, respectively. The image of FIG. 9 shows barb-/hook-type tissue anchors 91, 93. However, it should be understood that any types of anchors may be utilized in connection with shunt implant devices in accordance with embodiments of the present disclosure. In addition, or as an alternative, to the barb-/hook-type anchors 91, 93, the ends of the shunt implant device 90 may have flange or other-type anchor features 98, 99, which may be configured to hold the device 90 in position within a shunt opening when the features 98, 99 have a diameter or other dimension that is greater than the diameter or other dimension of the shunt opening, as described herein. The flange-type features 98, 99 can be fully circumferential or may be disposed around only a portion of the circumference or outer perimeter of the shunt device 90. In some implementations, the flange features 98, 99 are configured to be disposed within a chamber/vessel of a heart and help prevent withdrawal therefrom of the end(s) of the device 90. For example, the anchor features 98, 99 can advantageously project radially from the conduit axis such that they have a dimension (e.g., width, diameter, etc.) that is greater than a width/diameter of the conduit portion 95 of the device 90.

The tissue anchors 91, 93 shown in FIG. 9, as well as those described in connection with other embodiments of the present disclosure, may be any suitable or desirable types of tissue anchors. For example, in some embodiments, a tissue anchor associated with a shunt implant device comprises a pre-shaped wireform, such as a loop, coil, spiral, or the like, which may be configured to assume a relatively wide tissue anchor profile once deployed. Other types of tissue anchors that may be used include, but are not limited to, tension-fit or resistance-fit tissue anchors, such as stents or the like, barb-type tissue anchors, which may incorporate tip features configured to resist withdrawal of the anchor tip(s) from tissue in which it is embedded following embedding, cork-screw-type tissue anchors, and/or other types of tissue anchors that may or may not be known in the art.

As described in detail herein, the shunt implant device 90 may advantageously be dimensioned to have a length sufficient to traverse the distance from the target inflow implantation site (e.g., an interior of a pulmonary vein) to the target outflow implantation site (e.g., superior vena cava, right atrium). In some embodiments, the shunt implant device 90 advantageously includes a covering 96, which may be disposed within or without the frame 97, and may be at least partially fluid-tight to thereby facilitate funneling or channeling of blood flow through the medial conduit portion 95 of the shunt implant device 90. The shunt implant device 90 may comprise a covered stent or graft structure. For example, the device 90 may be covered with thin PTFE material, or other material or biological tissue. The anchor(s)

91, 93 of the inflow and outflow ends may be anchored/implanted in the relevant biological tissue in any suitable or desirable way.

Figure 10:
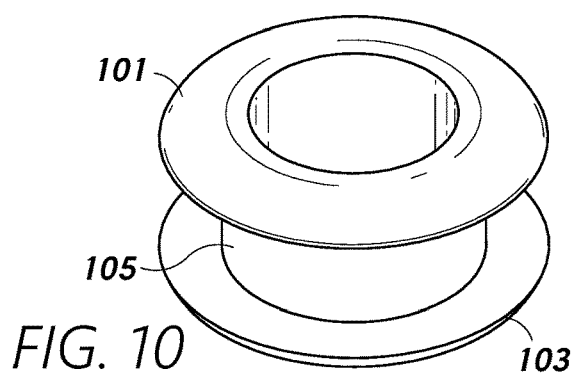
FIG. 10 illustrates an embodiment of a grommet-type shunt implant device in accordance with one or more embodiments.

FIG. 10 illustrates an embodiment of a grommet-type shunt implant device 100 in accordance with one or more embodiments of the present disclosure. As described above, the grommet-type shunt implant device 100 may be configured to clamp/secure the wall of a pulmonary vein and provide a shunt conduit therethrough. For example, the shunt implant device 100 may be used to clamp/hold the wall of a pulmonary vein to the wall of a superior vena cava and/or right atrium, wherein such walls may be a common wall or may be separate wall segments (e.g., separated by a gap and/or in contact with one another).

The implant device 100 may be configured to be inserted into a shunt opening in the pulmonary vein tissue wall, thereby at least partially filling the opening with the conduit portion 105 of the implant device. The implant device 100 further includes one or more flared or collared flange features 101, 103 configured to secure the implant device to one or more blood vessel/chamber walls, as described herein. In some embodiments, the flange features 101, 103 may be configured to be extended/projected axially with respect to an axis of the conduit 105 for delivery/transport thereof. That is, with the flange features actually projected, the grommet-type shunt implant device 100 may have a generally cylindrical form, wherein upon deployment, the flange features 101, 103 may be configured to flare radially outward to provide clamping/securing surfaces to hold the implant device 100 in place. For example, the flared flange features 101, 103 may comprise shape-memory metal configured to assume the flared configuration shown in FIG. 10 upon deployment from a delivery catheter or other delivery device/system. In some embodiments, when deployed, the flared features 101, 103, are angled at least partially towards one another to clamp or pinch the tissue wall(s) to which they are secured.

Pulmonary Vein Shunting Processes

Figure 11:
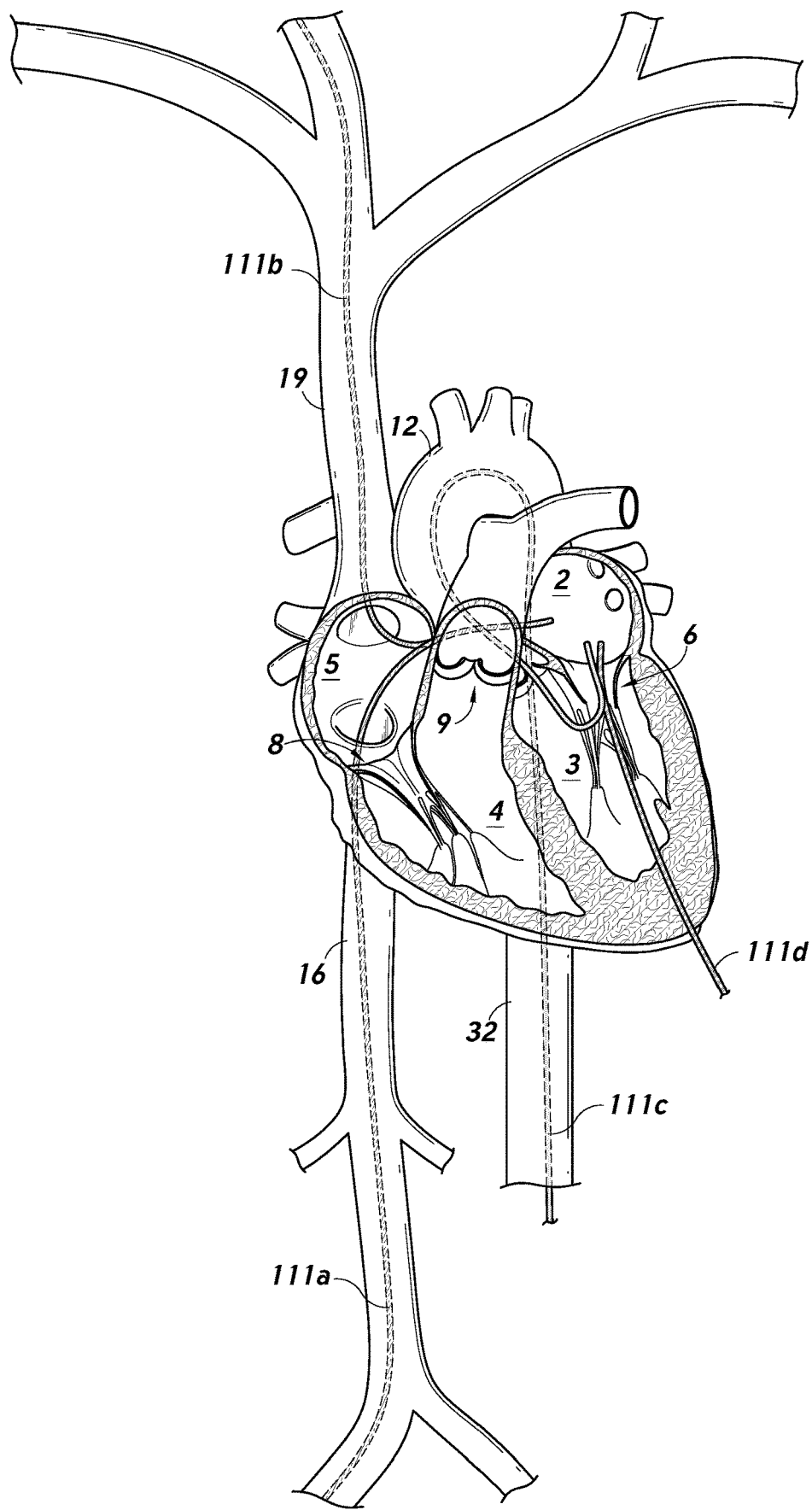
FIG. 11 is a cutaway view of a human heart and associated vasculature showing certain catheter access paths for pulmonary vein shunting procedures in accordance with one or more embodiments.

According to some solutions, pulmonary vein shunting can be achieved using a transcatheter approach, wherein a catheter/tool may be delivered to the left atrium, and ultimately the target pulmonary vein, through the vasculature of the patient, such as through one or more arteries or veins of the arm, groin, or neck. FIG. 11 is a cutaway view of a human heart and associated vasculature showing certain catheter access paths for pulmonary vein shunting procedures in accordance with one or more embodiments.

FIG. 11 shows various catheters 111 that may be used to implement pulmonary vein shunting in accordance with aspects of the present disclosure. The catheters 111 can advantageously be steerable and relatively small in cross-sectional profile to allow for traversal of the various blood vessels and chambers through which they may be advanced en route to, for example, the left atrium 2 or other anatomy or chamber. Catheter access to the left atrium 2 in accordance with certain transcatheter pulmonary vein shunting solutions may be made by first accessing the right atrium 5 via the inferior vena cava 16 (as shown by the catheter 111a) or the superior vena cava 19 (as shown by the catheter 111b) and crossing the atrial septum (e.g., in the area at or near the fossa ovalis) to access the left atrium 2.

Although access to the left atrium is illustrated and described in connection with certain examples as being via the right atrium and/or vena cavae, such as through a transfemoral or other transcatheter procedure, other access paths/methods may be implemented in accordance with examples of the present disclosure. For example, in cases in which septal crossing through the interatrial septal wall is not possible, other access routes may be taken to the left atrium 2. In patients suffering from a weakened and/or damaged interatrial septum, further engagement with the septal wall can be undesirable and result in further damage to the patient. Furthermore, in some patients, the septal wall may be occupied with one or more implant devices or other treatments, wherein it is not tenable to traverse the septal wall in view of such treatment(s). As alternatives to transseptal access, transaortic access may be implemented, wherein a delivery catheter 111c is passed through the descending aorta 32, aortic arch 12, ascending aorta, and aortic valve 7, and into the left atrium 2 through the mitral valve 6. Alternatively, transapical access may be implemented to access the target anatomy, as shown by delivery catheter 111d.

FIG. 12 is a flow diagram illustrating a process 1200 for forming a pulmonary vein shunt in accordance with one or more embodiments. FIG. 13 provides cross-sectional images of cardiac anatomy and certain devices corresponding to the process 1200 of FIG. 12 according to one or more embodiments of the present disclosure.

At block 1202, the process 1200 involves accessing the left atrium 2 of the heart of a patient. For example, access may be made via a transcatheter approach as described in detail herein. In some implementations, a delivery catheter 131 may be advanced to the right atrium 5 and further advanced through the interatrial septum 18 to access the left atrium 2, as shown in image 1302.

At block 1204, the process 1200 involves advancing the catheter 131 into a target pulmonary vein 24, such as a right superior pulmonary vein, as described in detail herein. The process 1200 may advantageously involve advancing the distal end of the catheter 131 to a wall portion 47 between the pulmonary vein 24 and the superior vena cava and/or right atrium 5. For example, the wall portion 47 may be a common wall between the pulmonary vein 24 and the superior vena cava and/or right atrium 5. Although shown as a common wall 47, it should be understood that the wall portion targeted for shunt formation may be a portion of a pulmonary vein wall 48 that is separate from the superior vena cava and/or right atrium wall 49.

At block 1206, the process 1200 involves forming an opening 50 in the pulmonary vein wall 47. For example, as stated above, the wall 47 may be a common wall between the pulmonary vein 24 and the superior vena cava and/or right atrium. The opening 50 may be formed in any suitable or desirable way, such as through wire/needle puncture, cutting, ablation, dilation, and or any combination thereof. With the opening 50 formed in the wall(s) 47 (and/or 48, 49), the process 1200 may or may not involve, at block 1208, deploying a shunt structure 130 within the opening 50 to retain the shunt pathway 50 post-implantation.

Additional Pulmonary Vein Shunting Areas

Various embodiments are described above relating to the formation of shunts between a right superior pulmonary vein and a right-side chamber/vessel of the heart. However, it should be understood that pulmonary vein shunting in accordance with aspects of the present disclosure may involve shunting from other pulmonary veins as well, wherein a shunt pathway may be formed and/or implanted between such other pulmonary vein(s) and a right-side chamber or vessel of the heart.

Figures 1, 14:
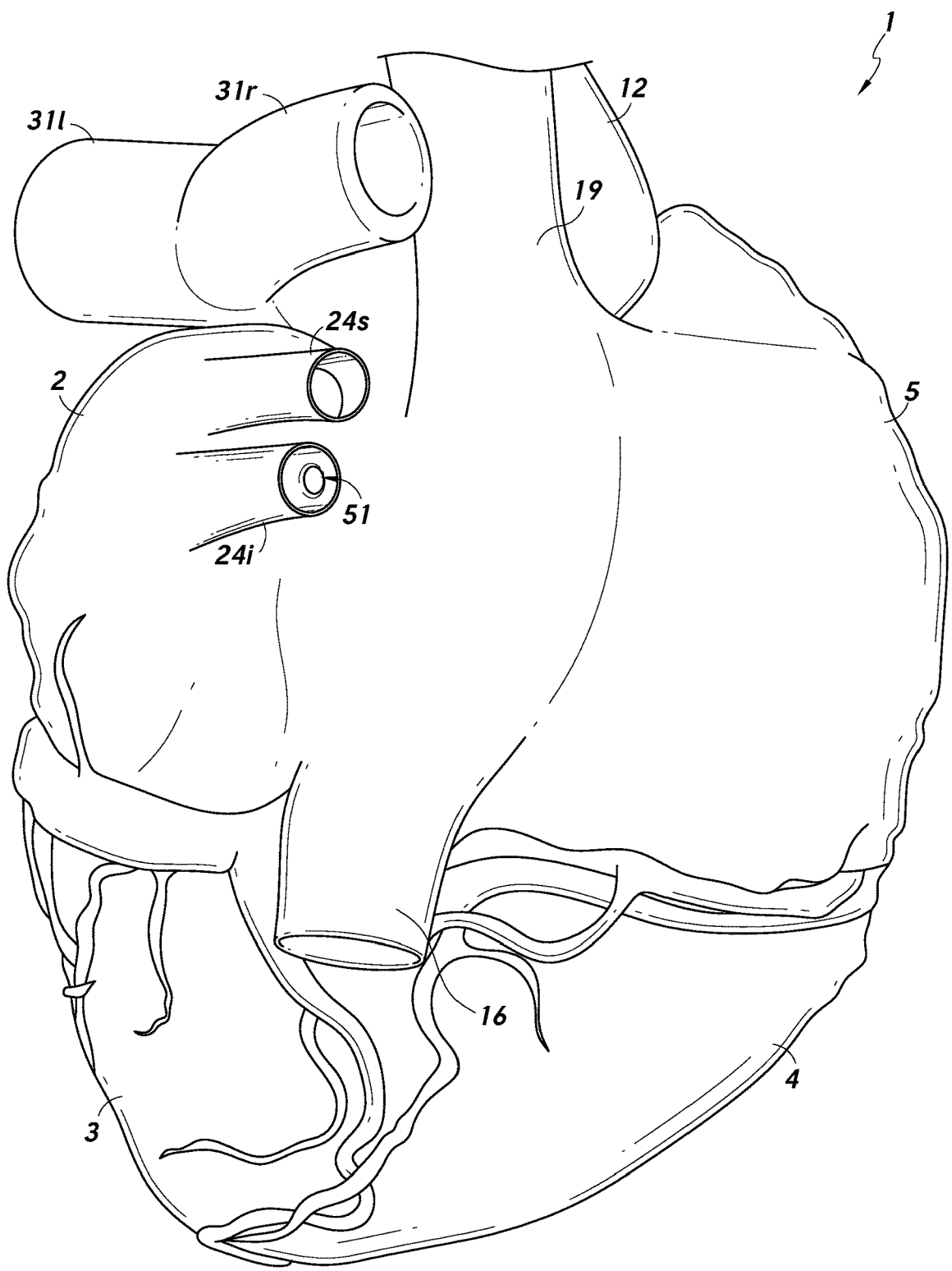
Figures 2, 14:
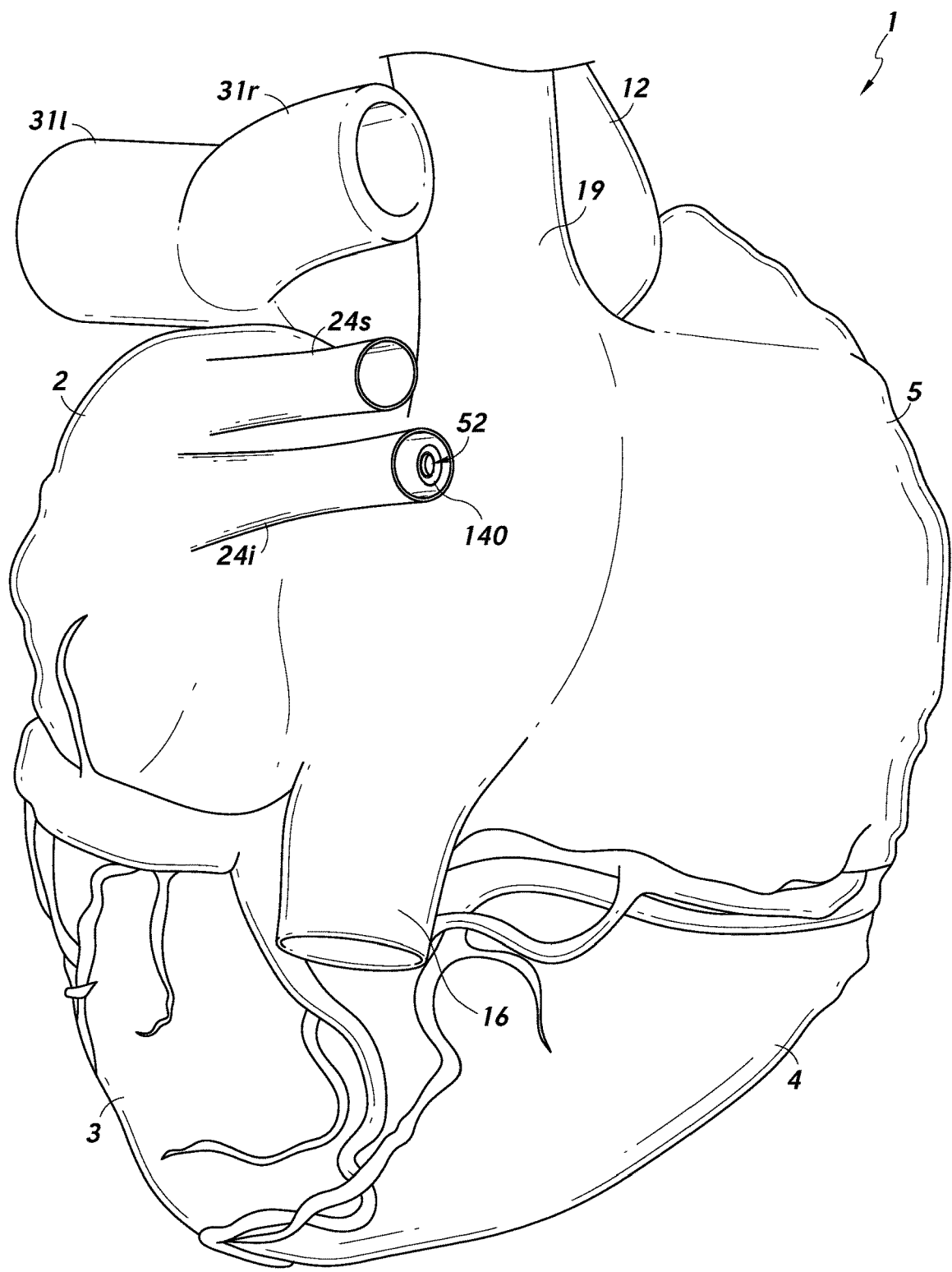

FIGS. 14-1 and 14-2 show posterior views of hearts having pulmonary vein shunts formed in right inferior pulmonary veins in accordance with one or more embodiments of the present disclosure. For example, as with other embodiments disclosed herein, the shunting solution shown in FIG. 14-1 can involve the formation of an opening 51 in a common wall between the right inferior pulmonary vein $24_i$ and the right atrium 5 and/or one of the vena cavae. The opening 51 shown in FIG. 14-1 may or may not be reinforced with a shunt implant device, such as a grommet- or stent-type shunt implant device, as described in detail herein.

FIG. 14-2 shows a shunt 52 in the right inferior pulmonary vein $24_i$ providing a shunt into the right atrium 5 in an area where no common wall exists between the pulmonary vein $24_i$ and the right side of the heart. As shown, a grommet-type shunt implant device 140 may be implanted to clamp the wall of the pulmonary vein $24_i$ to the wall of the right atrium 5 and/or one of the vena cavae. The grommet implant device 140 can serve to hold the blood vessel/chamber walls together and to form a fluid-tight seal around the opening 52.

Figure 15:
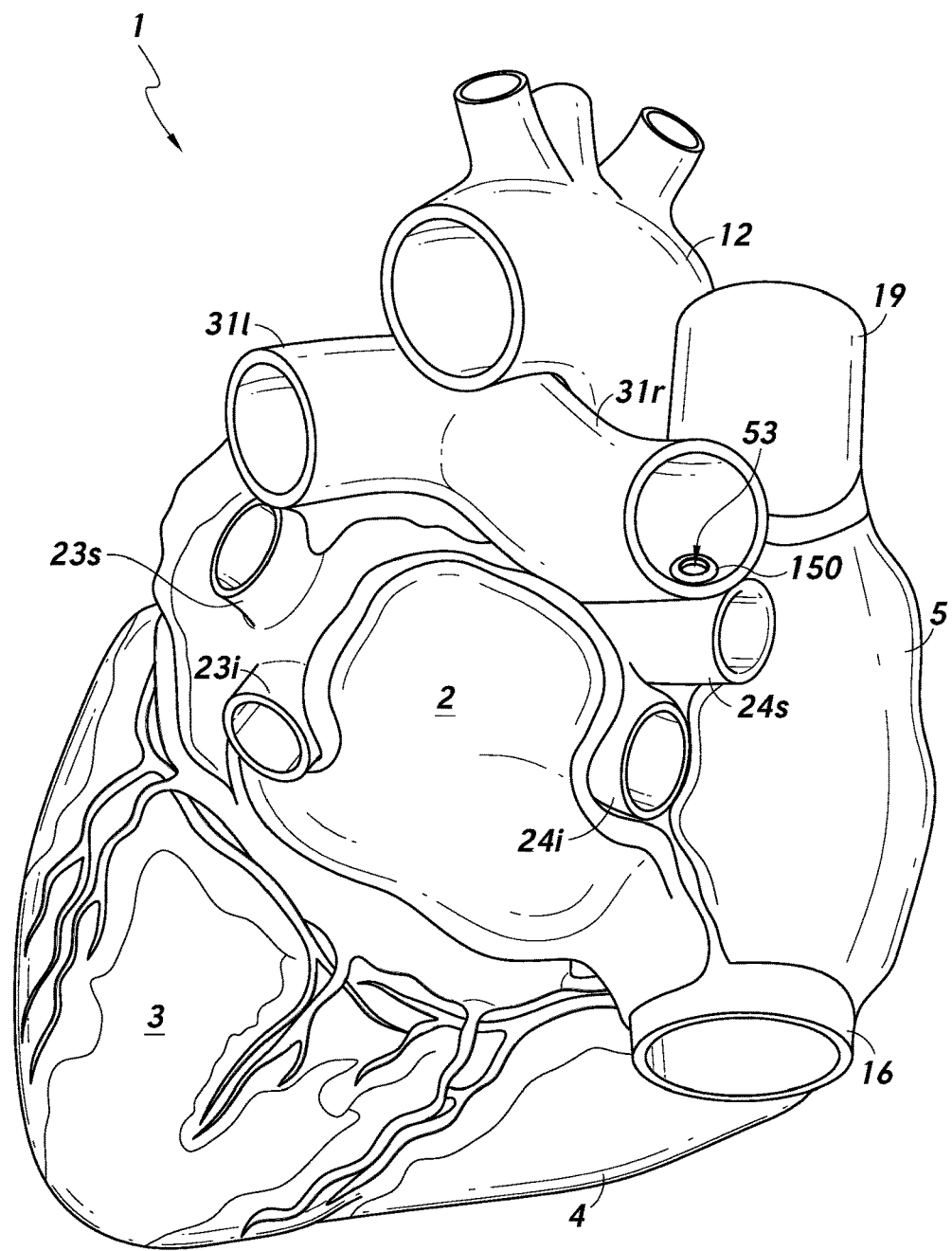
FIG. 15 shows a posterior view of a heart having a shunt formed in a right superior pulmonary vein and a right pulmonary artery in accordance with one or more embodiments.

FIG. 15 shows a posterior view of a heart having a shunt 53 formed in a right superior pulmonary vein $23_s$ and right pulmonary artery $31_r$ in accordance with one or more embodiments. Although a common wall between the pulmonary vein $24_s$ and the pulmonary artery $31_r$ may generally not be present, embodiments of the present disclosure may involve forming a fluid-tight conduit between such vessels, as shown in FIG. 15. For example, the blood vessels may be clamped together using a shunt implant device 150, such as a grommet-type shunt implant device as described in detail herein. The shunt 53 may allow oxygenated blood in the pulmonary vein $24$, to flow into the deoxygenated blood flow in the pulmonary artery $31_r$ flowing to the right lung (not shown).

Figure 16:
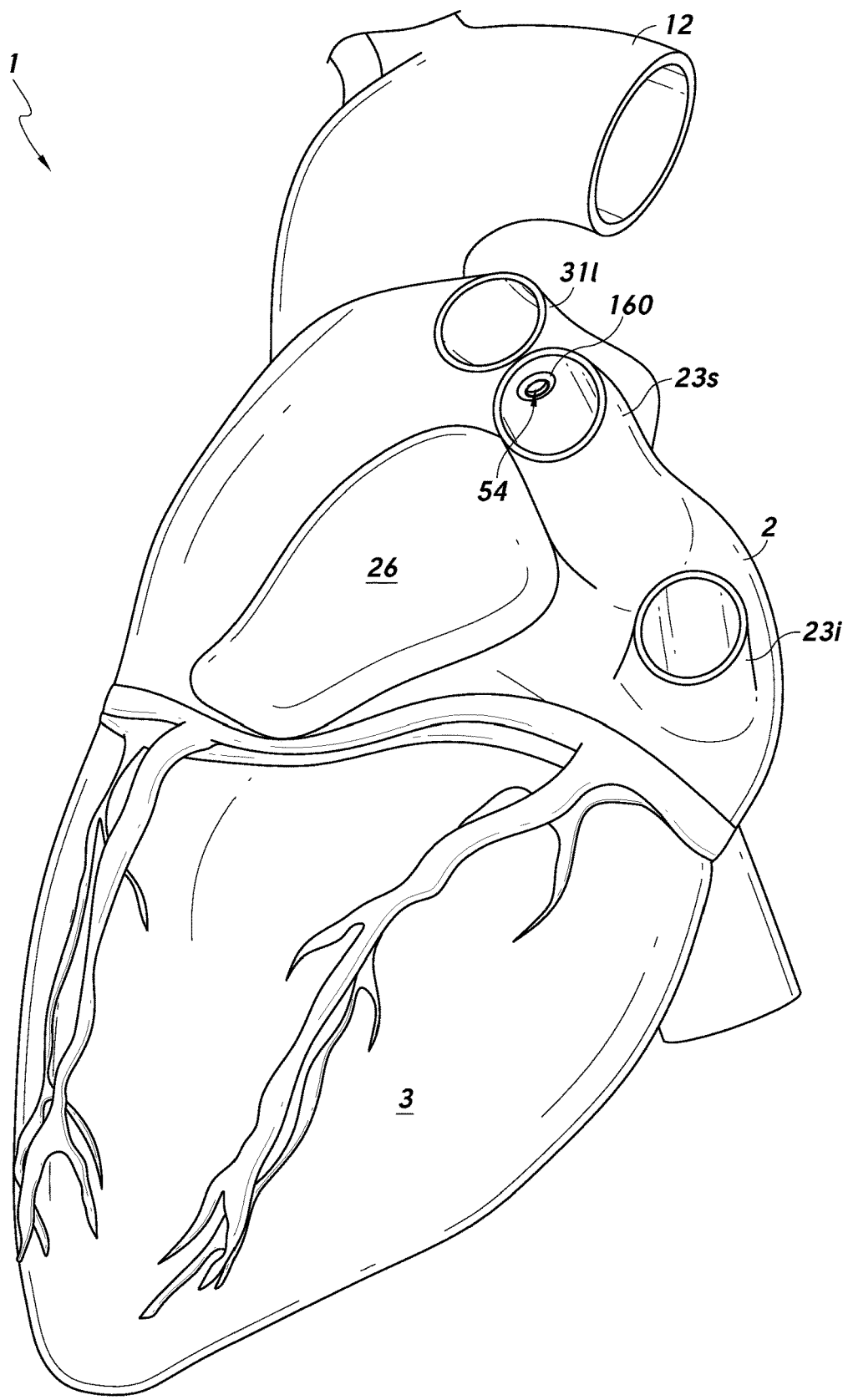
FIG. 16 shows a posterior view of a heart having a shunt formed in a left superior pulmonary vein and a left pulmonary artery in accordance with one or more embodiments.

FIG. 16 shows a posterior view of a heart having a shunt 54 formed in a left superior pulmonary vein $23_s$ and left pulmonary artery $31_l$ in accordance with one or more embodiments. Although a common wall between the pulmonary vein $23_s$ and the pulmonary artery $31_l$ may generally not be present, embodiments of the present disclosure may involve forming a fluid-tight conduit between such vessels, as shown in FIG. 16. For example, the blood vessels may be clamped together using a shunt implant device 160, such as a grommet-type shunt implant device as described in detail herein. The shunt 54 may allow oxygenated blood in the pulmonary vein $23_s$ to flow into the deoxygenated blood flow in the pulmonary artery $31_l$ flowing to the left lung (not shown).

ADDITIONAL EMBODIMENTS

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

It should be appreciated that in the above description of embodiments, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited.

Unless otherwise defined, all terms (including technical and scientific terms) used herein have the same meaning as commonly understood by one of ordinary skill in the art to which example embodiments belong. It be further understood that terms, such as those defined in commonly used dictionaries, should be interpreted as having a meaning that is consistent with their meaning in the context of the relevant art and not be interpreted in an idealized or overly formal sense unless expressly so defined herein.

The spatially relative terms "outer," "inner," "upper," "lower," "below," "above," "vertical," "horizontal," and similar terms, may be used herein for ease of description to describe the relations between one element or component and another element or component as illustrated in the drawings. It be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Unless otherwise expressly stated, comparative and/or quantitative terms, such as "less," "more," "greater," and the like, are intended to encompass the concepts of equality. For example, "less" can mean not only "less" in the strictest mathematical sense, but also, "less than or equal to."

What is claimed is:

1. A method of shunting blood, the method comprising:
   accessing a left atrium of a heart with a surgical instrument;
   advancing the surgical instrument into a right pulmonary vein fluidly coupled to the left atrium via an ostium of the right pulmonary vein, the right pulmonary vein having oxygenated blood disposed therein;
   forming an opening in a wall portion of the right pulmonary vein; and
   shunting oxygenated blood from the right pulmonary vein into a right-side structure of the heart that contains deoxygenated blood through the opening in the wall portion of the right pulmonary vein, thereby reducing left-side pressure in the heart and increasing oxygen concentration in the right-side structure.

2. The method of claim 1, wherein the wall portion is a common wall between the right pulmonary vein and the right-side structure.

3. The method of claim 1, wherein the right-side structure is a superior vena cava.

4. The method of claim 1, wherein the right-side structure is a right atrium of the heart.

5. The method of claim 1, wherein the right-side structure is a pulmonary artery.

6. The method of claim 1, wherein the right pulmonary vein is a right superior pulmonary vein.

7. The method of claim 1, wherein the right pulmonary vein is a right inferior pulmonary vein.

8. The method of claim 1, further comprising deploying a shunt structure within the opening in the wall portion of the right pulmonary vein to retain the opening in the wall portion of the right pulmonary vein.

9. The method of claim 8, further comprising anchoring the shunt structure to an interior wall of the right-side structure.

10. The method of claim 1, wherein:
    said accessing the left atrium is achieved via a transcatheter access path; and
    the surgical instrument comprises a catheter.

11. The method of claim 1, further comprising forming an opening in a wall portion of the right-side structure, wherein said shunting blood is through the opening in the wall portion of the right-side structure.

12. The method of claim 11, further comprising securing the opening in the wall portion of the right pulmonary vein to the opening in the wall portion of the right-side structure.

13. A method of shunting blood, the method comprising:
    accessing a left atrium of a heart with a surgical instrument;
    advancing the surgical instrument, from the left atrium, through an ostium of a right pulmonary vein fluidly coupled to the left atrium and into the right pulmonary vein;
    forming a first opening in a wall of the right pulmonary vein;
    forming a second opening in a wall of a right pulmonary artery;
    deploying a shunt implant in the first opening in the wall of the right pulmonary vein and the second opening in the wall of the right pulmonary artery, wherein the shunt implant is sized and shaped to hold open the first and second openings and to define a shunt flow path; and
    shunting blood between the right pulmonary vein and the right pulmonary artery through the shunt flow path.

14. The method of claim 13, wherein the shunt implant comprises a wireform stent.

15. The method of claim 13, wherein the shunt implant comprises a grommet-style device.

16. The method of claim 13, further comprising dilating the first opening in the wall of the right pulmonary vein using a dilator device.

17. The method of claim 13, further comprising holding the first opening in the wall portion of the right pulmonary vein against the second opening in the wall of the right pulmonary artery using the shunt implant.

18. The method of claim 13, wherein said advancing the surgical instrument involves doubling-back the surgical instrument from an orientation through an atrial septum to enter the right pulmonary vein, thereby forming a U-shaped configuration with the surgical instrument.

19. The method of claim 17, wherein the shunt implant is anchored to an interior wall of the right pulmonary vein using a first plurality of curved wire struts projecting from a first end of the shunt implant and anchored to an interior wall of the right pulmonary artery using a second plurality of curved wire struts projecting from a second end of the shunt implant.

20. A method of shunting blood, the method comprising:
    advancing an ablation instrument into a left atrium of a heart via a transcatheter access path;
    advancing the ablation instrument into a right pulmonary vein fluidly coupled to the left atrium;
    using the ablation instrument to direct ablation energy against a common wall separating the right pulmonary vein from at least one of a right atrium or superior vena cava of the heart, thereby forming an opening in the common wall;
    deploying an implant device within the opening in the common wall, wherein the implant device is sized and shaped to hold open the opening in the common wall and to define a shunt flow path; and
    shunting blood from the left atrium into the right atrium through the right pulmonary vein, the opening in the common wall, and the implant device.

21. The method of claim 20, further comprising anchoring the implant device to both sides of the common wall.

22. The method of claim 20, further comprising cauterizing tissue around the opening in the common wall using the ablation instrument.

23. The method of claim 22, wherein the common wall is associated with the right atrium.

24. The method of claim 20, wherein the common wall is associated with the superior vena cava.

* * * * *